United States Patent [19]

Miura et al.

[11] Patent Number: 4,484,943

[45] Date of Patent: Nov. 27, 1984

[54] METHOD AND APPARATUS FOR MAKING A FINE POWDER COMPOUND OF A METAL AND ANOTHER ELEMENT

[75] Inventors: Hirohisa Miura; Hiroshi Satou; Toshio Natsume; Hidenori Katagiri, all of Toyota, Japan

[73] Assignee: Toyota Jidosha Kabushiki Kaisha, Toyota, Japan

[21] Appl. No.: 471,003

[22] Filed: Mar. 1, 1983

[30] Foreign Application Priority Data

Mar. 1, 1982 [JP] Japan .................................. 57-32120
Mar. 9, 1982 [JP] Japan .................................. 57-37027
Mar. 9, 1982 [JP] Japan .................................. 57-37028

[51] Int. Cl.[3] ................................................ B22F 9/00

[52] U.S. Cl. .............................. 75/0.5 B; 75/0.5 BA; 75/0.5 BB; 75/0.5 BC; 75/0.5 C; 118/726

[58] Field of Search ........ 75/0.5 BC, 0.5 BB, 0.5 BA, 75/0.5 B, 0.5 R, 0.5 C; 423/344, 412; 427/94, 255.2; 118/726

[56] References Cited

U.S. PATENT DOCUMENTS 3,307,908 3/1967 Mandorf, Jr. ........................ 423/412
3,352,637 11/1967 Heymer et al. ...................... 423/412
4,122,155 10/1978 Prochazka ........................... 423/344
4,286,545 9/1981 Takagi et al. ....................... 118/726
4,395,440 7/1983 Abe et al. ............................ 118/726

*Primary Examiner*—W. Stallard
*Attorney, Agent, or Firm*—Oblon, Fisher, Spivak, McClelland & Maier

[57] ABSTRACT

A method of making a fine powder of a metal and another element in an intimate mutual relation such as an alloy or a chemical compound of a metal and a non metallic element, wherein a gaseous mixture of the metal and the other element is passed through a convergent-divergent nozzle and is thereby rapidly cooled by adiabatic expansion so that the metal and the other element react with each other while the resulting alloy or chemical compound is solidified to form fine particles.

34 Claims, 16 Drawing Figures

F I G. 1
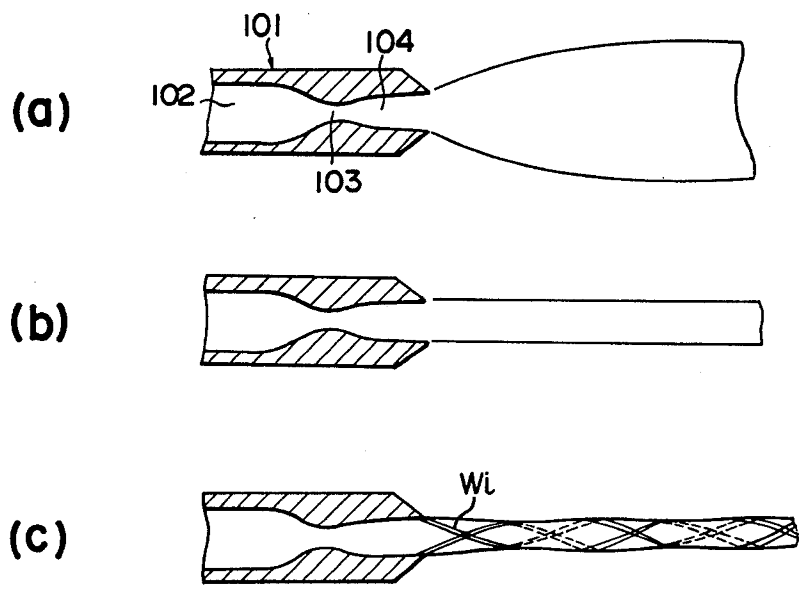
F I G. 2
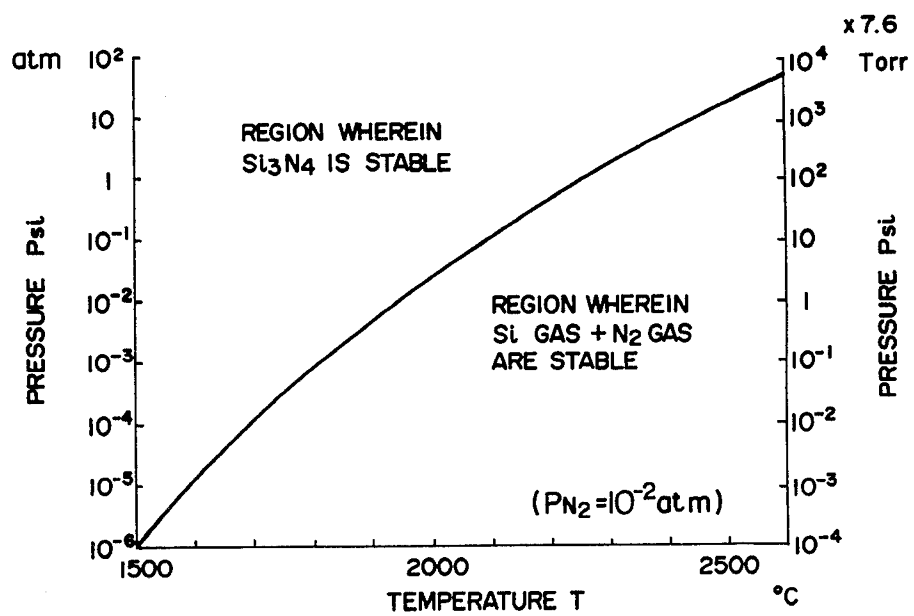

F I G. 11
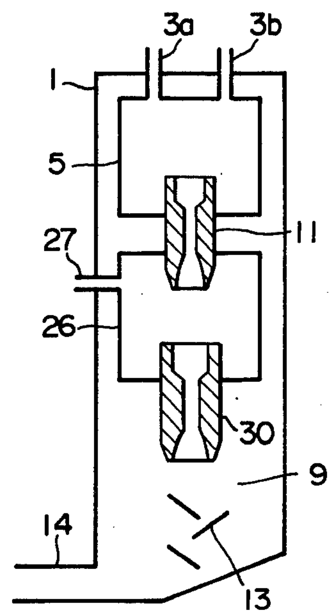
F I G. 12
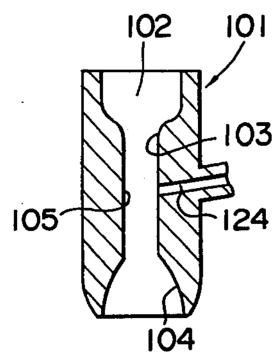
F I G. 13
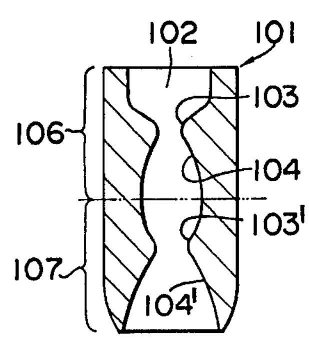
F I G. 14
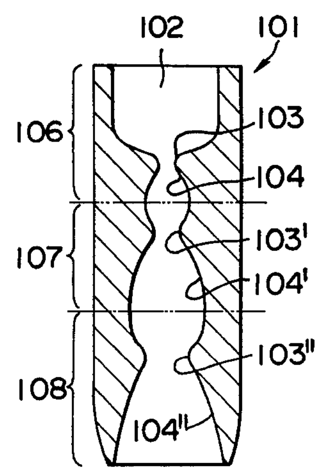

METHOD AND APPARATUS FOR MAKING A FINE POWDER COMPOUND OF A METAL AND ANOTHER ELEMENT

BACKGROUND OF THE INVENTION

The present invention relates to a method of making fine powder, and to an apparatus for making fine powder, for practicing the method. In particular, the present invention relates to a method of making fine powder and an apparatus for making fine powder in which at least one metal and another element which are to form the powder are rapidly cooled while being combined together by rapid expansion through a convergent-divergent nozzle.

In the following, the expression "compound" will be used in a wide sense, to mean a combination between two (or more) elemental substances, which are either chemically combined together to form a chemical compound, or which are intimately mixed together, as in an alloy. In other words, the expression "compound" will be used to include the possibilities of a chemical compound, an alloy, a solid solution, or a mixture, in a general sense. Similarly, the expression "metallic compound" will be used to mean such a compound, one at least of the elements of which is a metal.

A metallic compound, generally in the prior art, is made from a molten metal and another typically gaseous element, which are combined together to form the compound. This conventionally known method of making such a metallic compound has the disadvantages that: (a) the mixing in of impurities in the metallic compound is unavoidable; (b) it is not practicable to obtain the metallic compound as a fine powder with particle diameters of a few microns or less; (c) since the rate of cooling is limited to about $10^{5}$° C./sec, when rapid cooling of the molten material is to be performed it is not possible to obtain a metallic compound with good amorphous qualities.

There is also a family of conventionally known methods of making single crystals and thin films of various materials, including the gas phase growth method and/or the vacuum vapor deposition method. However, all of these methods involve gradual vapor deposition on a base plate, and therefore they are all subject to the disadvantages that the metallic material obtained is a mixture consisting of an amorphous layer directly deposited on the base plate and a crystalline layer formed thereover, and that the speed of growth is so slow that it is quite unsuitable for mass production.

In view of the shortcomings of the above described methods, there has been developed another method of making, in particular, silicon nitride fine powder, which is widely used as a raw material for ceramics. In this method, first metallic silicon is formed into a powder, and then this powder is heated within a flow of nitrogen or ammonia gas at a temperature of around 1500° C. or somewhat less, while controlling the pressure of the gas, so that the silicon and the nitrogen react together. However, this method has the shortcomings that the resulting silicon nitride is a mixture of alpha type silicon nitride and beta type silicon nitride, that it is difficult to obtain sufficiently fine silicon nitride powder, and that the metallic silicon which is used as the raw material is required to be pulverized, which takes a long time and is very troublesome.

Yet another prior art method that has been developed for producing silicon nitride involves a gaseous phase reaction between silicon halide and ammonia (or a chlorine compound containing nitrogen and ammonia) at a high temperature of 1000° to 1500° C. However, this method has the shortcoming that post processing is required afterwards, and pulverization and fractionation are required in order to obtain fine powder with a uniform particle diameter of one micron or less, since the raw silicon nitride powder produced is a mixture of particles of various diameters up to about three microns. Another problem with this method is that chlorine or hydrochloric acid which is also produced in the gaseous phase reaction cannot be prevented from becoming mixed with the silicon nitride and contaminating it.

SUMMARY OF THE INVENTION

Accordingly, it is the primary object of the present invention to provide a method for making a fine powder compound of a metal and another element, which can avoid the above mentioned disadvantages.

It is a further object of the present invention to provide a method for making a fine powder compound of a metal and another element, which can produce a highly pure fine powder.

It is a further object of the present invention to provide a method for making a fine powder compound of a metal and another element, which can produce a fine powder with a substantially uniform particle diameter.

It is a further object of the present invention to provide a method for making a fine powder compound of a metal and another element, which can produce a fine powder with a very small particle diameter.

It is a further object of the present invention to provide a method for making a fine powder compound of a metal and another element, which can produce a fine powder in an efficient fashion.

It is a further object of the present invention to provide a method for making a fine powder compound of a metal and another element, which can produce a fine powder in an economical fashion.

It is a further object of the present invention to provide a method for making a fine powder compound of a metal and another element, which can produce a fine powder of an amorphous crystalline structure.

It is a further object of the present invention to provide a method for making a fine powder compound of a metal and another element, which can produce a fine powder directly without any post processing being required.

It is a further object of the present invention to provide a method for making a fine powder compound of a metal and another element, which can produce a fine powder in a fashion suitable for mass production.

It is a further object of the present invention to provide a method for making a fine powder compound of a metal and another element, which does not require the metal to be laboriously pulverized before being compounded with the element.

It is a further object of the present invention to provide a method for making a fine powder compound of a metal and another element, which can produce a fine powder without any fractionation being necessary thereafter.

It is a further object of the present invention to provide a method for making a fine powder compound of a metal and another element, which does not require the resulting compound to be laboriously pulverized afterwards.

It is a further object of the present invention to provide a method for making a fine powder compound of a metal and another element, which can produce a fine powder without any undesirable admixture of acid thereinto.

It is a further object of the present invention to provide a method for making a fine powder compound of a metal and another element, which can produce a fine powder by a continuous process which is suitable for being continuously practiced.

It is a further object of the present invention to provide a method for making a fine powder compound of a metal and another element, which can produce a fine powder of controllable crystalline configuration.

It is a further object of the present invention to provide a method for making a fine powder compound of a metal and another element, which in particular is well adapted for production of silicon nitride.

It is a further and alternative object of the present invention to provide a method for making a fine powder compound of a metal and another element, which in particular is well adapted for production of aluminum nitride.

Further, it is a concomitant object of the present invention to provide an apparatus for making a fine powder compound of a metal and another element, which can practice a method whose provision has been detailed above as one or more of the objects of this invention.

According to the most general method aspect of the present invention, these and other objects relating to a method are accomplished by a method of making a fine powder of a metal and another element in an intimate mutual relation, wherein a gaseous mixture of said metal and said other element is passed through a convergent-divergent nozzle and is thereby rapidly cooled by adiabatic expansion.

According to such a method, as the gaseous mixture of the metal and the other element is rapidly so cooled by adiabatic expansion as it passes through the convergent-divergent nozzle, the metal and the other element become intimately mixed or alloyed or react together, and, as will be explained in the following, it has been determined by the present inventors that the very high speed of cooling is effective for producing a very fine and uniform powder. Since the method can be performed in a continuous fashion, it provides fine powder economically and practically in a way which is suitable for mass production, and no pre- or post-pulverization and/or fractionation are required, as opposed to the case of the conventional methods described above. The purity of the resulting powder, and the uniformity of its characteristics, is also very high. Further, as will be explained later in this specification, by suitably adjusting the parameters of the process such as the temperature and the pressure of the mixture before and after the adiabatic expansion through the convergent-divergent nozzle, it is possible to obtain metallic compound fine powder in various different required crystalline structures, such as amorphous, alpha type, and others.

Further, according to another method aspect of the present invention, these and other objects relating to a method are more particularly and concretely accomplished by a method of making a fine powder of a metal and another element in an intimate mutual relation, wherein said metal in a gaseous form is passed through a first convergent-divergent nozzle and is thereby rapidly cooled by adiabatic expansion, and is then mixed with said another element in the gaseous state, the resulting mixture being then passed through a second convergent-divergent nozzle and being thereby rapidly cooled by adiabatic expansion.

According to such a method, which may be practiced as an alternative to the method specified above in the event that the particular parameters of the specific metal and the specific other element which are to be used so demand, as will be explained later in this specification, as the vapor of the metal is rapidly cooled as it passes through said first convergent-divergent nozzle, it forms a mist of very fine metal particles, possibly also including some metallic vapor. Then, as the still effectively gaseous mixture of the metal and the other element is again rapidly cooled by adiabatic expansion as it passes through said second convergent-divergent nozzle, again the metal and the other element become intimately mixed or alloyed or react together, and, as will be explained in the following, it has been determined by the present inventors that the very high speed of cooling is effective for producing a very fine and uniform powder. Since the method can be performed in a continuous fashion, it again provides fine powder economically and practically in a way which is suitable for mass production, and no pre- or post-pulverization and/or fractionation are required, as opposed to the case of the conventional methods described above. The purity of the resulting powder, and the uniformity of its characteristics, is again also very high. Further, as will be explained later in this specification, by suitably adjusting the parameters of the process such as the temperature and the pressure of the metallic vapor before the adiabatic expansion through the first convergent-divergent nozzle, and the temperature and pressure of the mixture of the metal and the gas of the other element before and after the adiabatic expansion through the second convergent-divergent nozzle, it is possible to obtain metallic compound fine powder in various different required crystalline structures, such as amorphous, alpha type, and others.

Now, according to various particular applications of the methods of the present invention, the metal and the other element which are reacted or alloyed together may be any suitable arbitrary combination of a metal and an element which react or may be alloyed or intimately mixed together, and in particular the metal may be silicon, aluminum, titanium, or a combination thereof, while the other element or elements may be nitrogen, carbon, oxygen, or another metallic element, in which case the resulting compound may not be a chemical compound but may be an alloy or a metal-metal compound. Further, the other element may be supplied not only as a gas of itself alone but as one component of a compound gas; for example, in the case that the other element is nitrogen, it may be supplied not only as nitrogen gas but alternatively in the form of ammonia.

Now, in particular, when silicon nitride fine powder is to be produced from a mixture gas consisting of metallic silicon vapor and nitrogen gas or a gas which can produce or evolve nitrogen gas such as ammonia, the temperature of the mixture gas before the adiabatic expansion through the convergent-divergent nozzle may be substantially equal to 2000° C. or higher, and its pressure may be substantially equal to $10^{-1}$ atmosphere or lower, and as will be explained later such a method will produce alpha type or amorphous silicon nitride powder having a particle diameter of one micron or less. Further, in this case, it is possible to produce alpha type silicon nitride powder having a particle diameter of one micron or less by setting the temperature of the metallic compound after the adiabatic expansion through the convergent-divergent nozzle to be in the range of 1000° C. to 1500° C., and it is possible to produce amorphous silicon nitride powder of a smaller particle diameter by setting the temperature of the metallic compound after the adiabatic expansion through the convergent-divergent nozzle to be equal to or lower than 800° C.

Further, according to the most general apparatus aspect of the present invention, these and other objects relating to an apparatus are accomplished by an apparatus for making a fine powder of a metal and another element in an intimate mutual relation, comprising: a reaction chamber which can contain a source of metal vapor; a means for heating said reaction chamber; a means for introducing gas into said reaction chamber; a condensation chamber; and a convergent-divergent nozzle leading from said reaction chamber to said condensation chamber.

According to such an apparatus, the method first described above may be conveniently performed by charging the metal into the reaction chamber, heating it up by said heating means, supplying said other element which is a gas into said reaction chamber, and venting the resultant mixture of metal vapor and said other element into said condensation chamber via said convergent-divergent nozzle, the resulting metallic compound fine powder settling out in said condensation chamber to be collected. As the gaseous mixture of the metal and the other element is rapidly so cooled by adiabatic expansion as it passes through the convergent-divergent nozzle, the metal and the other element become intimately mixed or alloyed or react together, and, as will be explained in the following, it has been determined by the present inventors that the very high speed of cooling is effective for producing a very fine and uniform powder, and has the other advantages outlined previously and in the following.

Further, according to another more particular apparatus aspect of the present invention, these and other objects relating to an apparatus are more particularly and concretely accomplished by an apparatus for making a fine powder of a metal and another element in an intimate mutual relation, comprising: a first reaction chamber which can contain a source of metal vapor; a first means for heating said first reaction chamber; a second reaction chamber which can contain a source of metal vapor; a first means for introducing gas into said second reaction chamber; a condensation chamber; a first convergent-divergent nozzle leading from said first reaction chamber to said second reaction chamber; and a second convergent-divergent nozzle leading from said second reaction chamber to said condensation chamber.

According to such an apparatus, the method secondly described above may be conveniently performed by charging the metal into the first reaction chamber, heating it up by said heating means, and venting the resultant metal vapor through said first convergent-divergent nozzle into said second reaction chamber. As will be explained later in this specification, as the vapor of the metal is rapidly cooled as it passes through said first convergent-divergent nozzle, it forms a mist of very fine metal particles, possibly also including some metallic vapor. Then said other element which is a gas is supplied into said second reaction chamber, and the resultant mixture of metal vapor (possibly including metal mist) and said other element in said second reaction chamber is vented into said condensation chamber via said second convergent-divergent nozzle. As the gaseous mixture of the metal or metal mist and the other element is rapidly so cooled by adiabatic expansion as it passes through the second convergent-divergent nozzle, the metal and the other element become intimately mixed or alloyed or react together, and the resulting metallic compound fine powder settles out in said condensation chamber to be collected. As will be explained in the following, it has been determined by the present inventors that the very high speed of cooling is again effective for producing a very fine and uniform powder, and has the other advantages outlined previously and in the following.

Further, according to a yet more particular apparatus aspect of the present invention, these and other objects relating to an apparatus are more particularly and concretely accomplished by employing a convergent-divergent nozzle which has, in order along its axis, and inlet portion, a throat portion toward which the inlet portion converges, a constant cross section portion of an axial length which is equal to or greater than the diameter of the throat portion, and an expansion portion.

According to such a convergent-divergent nozzle, the mixture of a metal vapor and/or mist and another element which are passing through the convergent-divergent nozzle takes a certain time interval to pass along the constant cross section portion, and during this time period the reaction and/or mixing between the metal vapor and/or mist and the other element can progress further than in the case of a normal convergent-divergent nozzle which does not have such a constant cross section portion, and therefore, conversion of gaseous mixture into a compound is much improved, resulting in a purer form of fine powder and in much reduced particle size.

Further, according to a yet more particular apparatus aspect of the present invention, these and other objects relating to an apparatus are more particularly and concretely accomplished by employing a convergent-divergent nozzle which has a plurality of throat and expansion portions so as to have, in order along its axis, and inlet portion, a first throat portion toward which the inlet portion converges, a first expansion portion, a second throat portion toward which the downstream end of the first expansion portion converges, and a second expansion portion, and so on.

According to such a convergent-divergent nozzle, a mixture gas consisting of a metal vapor and/or mist and another element to be compounded therewith is adiabatically expanded through the first throat portion and then through the first expansion portion while being very quickly cooled by the expansion, and in this case, according to the design of the pressure difference between the inlet and the outlet side of the first throat portion, a shock wave is formed just before or upstream of the second throat portion, thereby generating a strong turbulence in the mixture gas just as it enters the second throat portion. This high turbulence persists as the mixture gas flows through the second throat portion and through the second expansion portion. By this high turbulence of the mixture gas, the reaction and/or mixing of the metal vapor and/or mist and the other element is very well promoted.

BRIEF DESCRIPTION OF THE DRAWINGS

The present invention will now be shown and described with reference to several preferred embodiments of the method and of the apparatus thereof, and with reference to the illustrative drawings. It should be clearly understood, however, that the description of the preferred embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

FIG. 1, which consists of three figures (a), (b), and (c), shows an axial sectional view of a convergent-divergent nozzle or Laval nozzle in its three different operational conditions of under expansion, proper expansion, and over expansion;

FIG. 2 is a reaction state diagram relating particularly to silicon nitride production, showing regions of temperature and pressure in which silicon nitride is stable and in which a combination of metallic silicon vapor and nitrogen gas is stable as a gas when the partial pressure of the nitrogen gas is $10^{-2}$ atmospheres;

FIG. 11 is a partial and rather schematic view, similar to FIGS. 3, 4, and 5, showing an apparatus for making fine powder which is a fourth preferred embodiment of the apparatus of the present invention;

FIG. 12 is an axial sectional view, similar to FIGS. 7, 8, and 9, showing a convergent-divergent nozzle which has an input port for gas formed at an intermediate portion thereof;

FIG. 13 is an axial sectional view, similar to FIGS. 7, 8, 9, and 12, showing a convergent-divergent nozzle which has two throats and two expansion portions; and FIG. 14 is an axial sectional view, similar to FIGS. 7, 8, 9, 12, and 13, showing a convergent-divergent nozzle which has three throats and three expansion portions.

DESCRIPTION OF THE PREFERRED EMBODIMENTS

Figure 3:
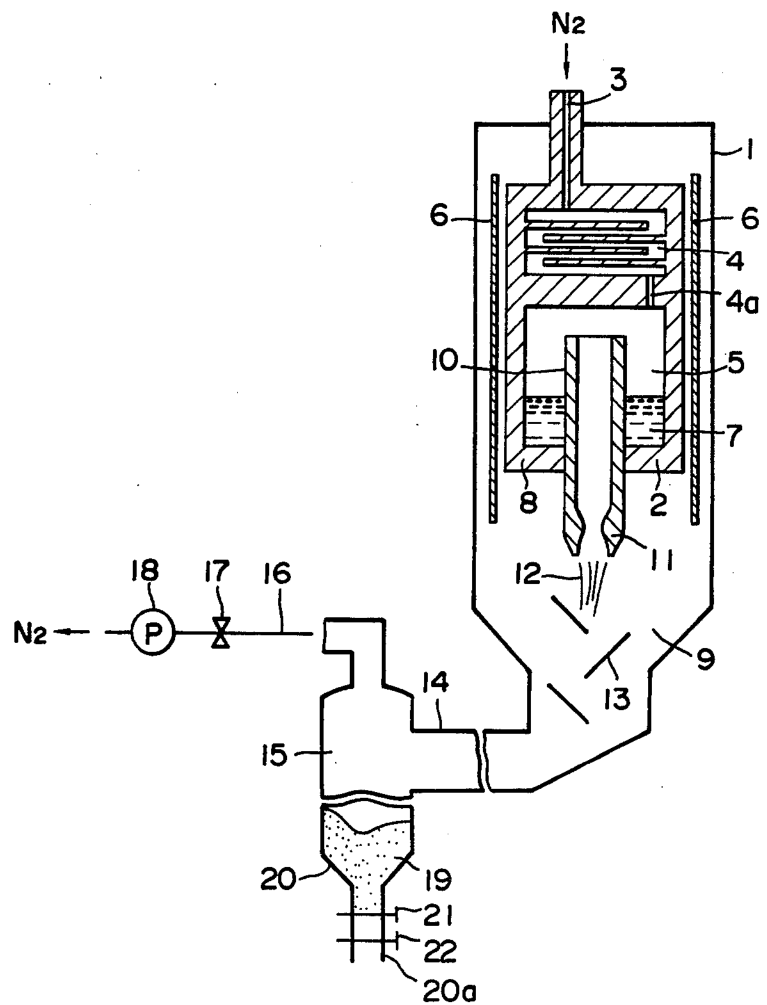
FIG. 3 is a schematic structural diagram, showing the first preferred embodiment of the apparatus for making a fine powder compound of a metal and another element, according to the present invention.

The present invention will now be described with reference to several preferred embodiments of the method and the apparatus thereof, and with reference to the appended drawings. However, first a general discussion of the particular problems inherent in the production of silicon nitride will be given, along with an outline of the general solutions discovered by the present inventors.

THE PARTICULAR CASE OF SILICON NITRIDE PRODUCTION

A primary feature of the method of making fine powder of a compound of a metal and another element according to the present invention is the concept of rapidly cooling a gaseous mixture of the metal and the element and causing them to react with one another while being very rapidly cooled by being passed through a convergent-divergent nozzle. Now, the way in which rapidly cooling a mixture of the metal and the element is effective for obtaining extremely fine metallic compound powder will be explained in what follows with regard to, in particular, the production of silicon nitride fine powder from a mixture of metallic silicon gas and nitrogen gas by rapidly cooling it.

Metallic silicon is a material which is rather difficult to vaporize, and it has an equilibrium vapor pressure of only 0.5 torr ($6.6\times10^{-4}$ atm) even at the relatively high temperature of 2000° C. It follows that the efficiency in terms of the use of thermal energy of the method of making silicon nitride fine powder by heating metallic silicon to a temperature of 2000° C. or higher is not any better than the efficiency of conventional production methods. However, because in the method of the present invention the metallic silicon is rapidly converted from the vaporized state to the solid state by rapidly cooling the silicon vapor, the method according to this invention can practically and economically produce metallic compound fine powder which has an extremely fine particle diameter of the order of 0.1 micron and also has substantially uniform particle diameter.

On the other hand, according to the above described conventional ways of making silicon nitride powder based upon the gas phase reaction, such fine and uniform metallic compound powder production cannot be obtained. For example, one reason for this is that the reaction between metallic silicon and nitrogen gas at a relatively low temperature of between 900° C. and 1700° C. produces silicon nitride which is stable over this temperature range. Therefore, when making silicon nitride by a gas phase reaction between a metallic silicon producing gas (such as silane gas, $SiH_4$) and a nitrogen producing gas (such as ammonia gas, $NH_3$), at a temperature of for instance between 900° C. and 1700°

C., the reaction rather easily advances in the direction where metallic silicon and nitrogen gas react to form solid silicon nitride, and accordingly the silicon nitride particles grow extremely quickly and become coarse particles in a relatively short time period.

COOLING BY EXPANSION

Now, the kind of cooling means which is appropriate for very rapidly cooling a gaseous mixture of a metal and another element will be explored. Various methods have been used in the past for rapidly cooling gas or a mixture of gases. The present inventors have conducted various experimental studies relating to the optimum method for cooling a mixture of gases for use in the process of obtaining metallic compound fine particles, and have come to the conclusion that an extremely effective technique is to expand the gaseous mixture through a convergent-divergent nozzle or Laval nozzle, of the type which is used as a nozzle for rocket propulsion devices. Such a convergent-divergent nozzle is capable of rapidly cooling a gaseous mixture by adiabatic expansion of said gaseous mixture through it, and is capable of providing a cooling speed of the order of $10^{6}$° C./second.

A convergent-divergent nozzle, as illustrated in FIGS. 1(*a*), 1(*b*), and 1(*c*) of the appended drawings, as generally designated by reference numeral 101, which comprises an inlet portion 102, a throat portion 103, and an expansion portion 104, arranged in order along its axis, can be operated in any one of three operational modes, under expansion, proper expansion, and over expansion, according to the magnitude of the ratio between the inlet side pressure (stagnation point pressure) and the outlet side pressure (back pressure) in the current nozzle operational situation. Now, after conducting various experimental studies relating to the optimum operating conditions for convergent-divergent nozzles, and after considering all three of these operational modes for the convergent-divergent nozzles, for making a metallic compound fine powder by rapidly cooling a gaseous mixture of metal and another element by passing it through said convergent-divergent nozzle, the present inventors have found that the proper expansion operational condition or the over expansion operational condition, which produce large pressure and temperature changes at high speed by producing an irregular flow or so called shock wave flow (denoted in FIG. 1(*c*) by "$W_i$"), are more effective than the under expansion operational condition which produces a smooth supersonic flow and which is utilized in rocket propulsion devices. Further, the present inventors have determined that the use of a convergent-divergent nozzle in such proper expansion operational conditions or over expansion operational conditions can be extremely effective for promoting the chemical reaction or the production of an alloy between metallic vapors of various kinds, or between a metallic vapor and a non metallic gas of various kinds.

Now, the optimum temperature and pressure conditions for the gaseous mixture before and after the rapid cooling, i.e. before and after the adiabatic expansion through the convergent-divergent nozzle, will be discussed, with reference to the production of silicon nitride fine powder.

The temperature and pressure conditions at which silicon nitride either breaks up or stays in the reacted state are determined by the second law of thermodynamics. In other words, the chemical reaction between metallic silicon vapor and nitrogen gas can be expressed in the following formula (1);

$$3(S_i)+2(N_2)=(Si_3N_4) \quad (1)$$

The change of free energy dF in this formula may be expressed by the following formula (2):

$$dF=dF_0+RT\ ln\ ((P_{Si})^{-3}\cdot(P_{N2})^{-2}) \quad (2)$$

wherein:

$dF_0$ is the reference free energy change;
R is the gas constant;
T is the temperature in degrees Kelvin;
$R_{Si}$ is the partial pressure of silicon vapor; and
$R_{N2}$ is the partial pressure of nitrogen gas.

This reduces to the following formula (3):

$$dF=-495853-7.755T\log T+205.22T-4.575Tx(3\log P_{Si}+2\log P_{N2}) \quad (3)$$

In this formula (3), silicon nitride is stable as a solid when dF is negative, while metallic silicon vapor and nitrogen gas are stable as gases when dF is positive.

In this connection, when ammonia gas is used instead of nitrogen gas, the chemical reaction between metallic silicon vapor and ammonia gas can be expressed in the following formula:

$$3(Si)+4(NH_3)=(Si_3N_4)+6(H_2)$$

In FIG. 2 of the accompanying drawings, there is shown a reaction state diagram indicating a region in which silicon nitride is stable and a region in which metallic silicon vapor and nitrogen gas are stable as gases when the partial pressure of nitrogen gas, i.e. $P_{N2}$, is $10^{-2}$ atmospheres (7.6 torr). From FIG. 2, it can be seen that metallic silicon vapor and nitrogen gas are more stable than solid silicon nitride at a pressure of around $10^{-2}$ atmospheres (7.6 torr) when the temperature is greater than about 2000° C.

Therefore, in the method of making fine powder according to the present invention, it will be clear that it is preferable to mix the metallic vapor and the other element in the gaseous state in the region wherein the metallic vapor and the other element are stable without combining together, to rapidly cool the mixture gas into the region in which the metallic compound is stable by rapidly passing said mixture gas through a convergent-divergent nozzle, and to continue cooling without promoting particle grain growth. If the temperature and pressure of the region in which the metallic vapor and the other element are stable without combining together is located in a temperature and pressure range which is difficult to obtain on an industrial basis, for instance in the region of 3000° C., then a method for obtaining metallic compound fine powder at a relatively low temperature in the same way as in the case in which said region in which the metallic vapor and the other element are stable without combining together is located in a temperature and pressure range which is reasonably easy to obtain industrially can be: to connect in series two units each comprising a reaction chamber and a convergent-divergent nozzle, to produce metallic vapor at a temperature which is practically achievable on an industrial basis in the first reaction chamber, to vent this metallic vapor to the second reaction chamber via a first convergent-divergent nozzle while rapidly cooling it so as to form metallic powder as a fine mist, to mix this fine mist metallic powder in the second chamber with the gas of the other element, and then to vent this mixture through a second convergent-divergent nozzle while again rapidly cooling it as the metallic mist particles and the other element are reacting together.

THE CONSTRUCTION OF THE FIRST APPARATUS EMBODIMENT

In FIG. 3 there is shown a schematic structural view of an apparatus for making fine powder which is the first preferred embodiment of the apparatus of the present invention. In this figure, the reference numeral 1 denotes a furnace shell which is substantially formed as a closed container, and a melting pot or crucible 2 is provided within this furnace shell 1. The upper part of this melting pot 2 is formed as a gas preheating chamber 4, which is of a convoluted form for the sake of good heat transfer, to the upper part of which a gas introduction port 3 is communicated; a pipe leads from this gas introduction port 3 to the outside. The lower part of the melting pot 2 is formed as a reaction chamber 5, and an opening 4a leads from the gas preheating chamber 4 to the reaction chamber 5 to allow gas to flow therebetween. A heater 6 is disposed generally around the melting pot 2, so as to heat up the melting pot 2 and the preheating chamber 4 and the reaction chamber 5 formed therein.

The bottom 8 of the reaction chamber 5 has a conduit 10 set thereinto, and this conduit 10 leads downwards to communicate the reaction chamber 5 with a condensation chamber 9 defined within the furnace shell 1 below the melting pot 2. Particularly according to the principle of the present invention, the lower end of this conduit 10 is formed as a convergent-divergent nozzle 11 of the above described sort. Within the condensation chamber 9, opposed to the convergent-divergent nozzle 11, there are provided a plurality of deceleration plates 13. The lower end of the condensation chamber 9 is communicated, via a conduit 14, with a powder collection chamber 15, to a middle portion of which said conduit 14 is communicated.

The upper part of the powder collection chamber 15 is communicated, via a conduit 16 and a control valve 17, to a vacuum pump 18; and the lower part of the powder collection chamber 15 is formed as a powder reservoir 20, which is communicated, via a downwardly extending conduit 20a within which are set two valves 21 and 22, to the outside. Although it is not so shown, the gas sucked out by the vacuum pump 18 is as a matter of practice recycled to be resupplied into the gas introduction port 3, for reasons of economical operation.

THE OPERATION OF THE FIRST APPARATUS EMBODIMENT

The apparatus according to the first preferred embodiment of the apparatus aspect of the present invention is used as follows. First, metal is charged into the reaction chamber 5 of the melting pot 2, and then the heater 6 is operated so as to heat up the melting pot 2 and the metal charged therein to a predetermined temperature $T_1$, so as to melt this metal into a pool of molten metal 7, and so as further to boil said molten metal 7. Gas of a single element is then flowingly introduced through the gas introduction port 3 into the gas preheating chamber 4, the flow rate of this gas introduction being determined as will be understood later according to the control of the valve 17 which controls the removal of this gas from the other end of the apparatus by the action of the vacuum pump 18 which is being operated. This gas is heated up within the gas preheating chamber 4, and then passes in the heated state from the gas preheating chamber 4 in to the reaction chamber 5, wherein it mixes with the vapor of the boiling metal 7 which is being emitted from the free surface thereof.

This mixture gas is then ejected from the reaction chamber 5 according to the difference of pressures between the interior of the reaction chamber 5 which is at a predetermined pressure $P_1$ and the interior of the condensation chamber 9 which is at a predetermined pressure $P_2$ substantially lower than the pressure $P_1$ through the conduit 10 and through the convergent-divergent nozzle 11 at the lower end of said conduit 10, and sprays out of the convergent-divergent nozzle 11 as a jet 12 which impinges against the deceleration plates 13. As this mixture gas passes through the convergent-divergent nozzle 11, as explained previously it reaches a supersonic speed and expands adiabatically very quickly, while the metal vapor and the introduced gas react together chemically, and is cooled down by this adiabatic expansion to a second temperature $T_2$, and the product of this reaction forms a fine powder by condensation caused by this cooling, said powder being a chemical compound of the metal 7 charged in the reaction chamber 5 of the melting pot 2 and of the gas injected through the port 3. The high rate of cooling of this reaction product ensures that the resulting powder is very fine and uniform and has good crystalline characteristics.

The powder produced, after impinging on the deceleration plates 13 and being slowed down thereby from its aforesaid high speed, settles down to the bottom of the condensation chamber 13 and flows through the conduit 14 to collect as a powder heap 19 in the lower portion of the powder collecting chamber 15, this flow being aided by the excess gas, since more gas flow is provided via the port 3 into the apparatus than can be combined with the flow of metal vaor which is boiling off the free surface of the pool 7 of boiling metal in the reaction chamber 5. This excess gas then passes out of the top of the powder collecting chamber 15 through the conduit 16 under the control of the valve 17, being sucked out of the apparatus by the operation of the vacuum pump 18. The sucking rate of the pump 18 and the opening amount of the valve 17 and the injection flow rate of the gas through the gas introduction port 3 are all controlled so as to maintain the pressures in the reaction chamber 5 and in the condensation chamber 9 at substantially their respective predetermined desired values $P_1$ and $P_2$.

From time to time, some of the accumulated powder heap 19 in the bottom portion of the powder receiving chamber 15 is removed via the conduit 20a, by alternate operation of the valves 21 and 22 in a per se obvious fashion, without disturbing the depressurized state of the apparatus.

DESCRIPTION OF THE FIRST METHOD EMBODIMENT

The apparatus described above according to the first preferred embodiment of the apparatus of the present invention was operated by charging metallic silicon in the reaction chamber 5 of the melting pot 2, by operating the heater 6, and by injecting nitrogen gas ($N_2$) through the gas introduction port 3 to the gas preheating chamber 4. The temperature $T_1$ to which the melting pot 2 and the molten silicon metal pool 7 in the reaction chamber 5 thereof were heated was 2300° C., and the rate of flowing in of the nitrogen gas and the opening of the valve 17 and the suction of the vacuum pump 18 were controlled so as to keep the pressure $P_1$ within the reaction chamber 5 at approximately 20 torr (0.026 atmospheres) and so as to keep the pressure $P_2$ within the condensation chamber 9 at approximately 5 to 6 torr (0.0066 to 0.0079 atmospheres). In this case, in this embodiment, the nitrogen gas was not preheated up to 2300° C., but was preheated only up to approximately 1350° to 1500° C.

As explained above, the vaporized silicon produced by the boiling of the molten silicon pool 7 mixed within the reaction chamber 5 with the heated nitrogen gas flowing thereinto through the aperture 4*a*, and this mixture of silicon vapor and nitrogen gas, while reacting chemically, then flowed out through the conduit 10 and through the convergent-divergent nozzle 11 into the condensation chamber 9, attaining a supersonic speed as it passed through the convergent-divergent nozzle 11. A fine powder of silicon nitride particles condensed out of this reacting mixture gas and impinged against the deceleration plates 13, later being carried out of the condensation chamber 9 by the flow of excess nitrogen gas so as to be accumulated within the powder receiving chamber 15 and so as to be removed therefrom from time to time as explained above, while the excess nitrogen gas was removed by the vacuum pump 18 to be recycled. The temperature $T_2$ to which the mixture gas was cooled by the adiabatic expansion within the convergent-divergent nozzle 11 as it emerged into the condensation chamber 9 was about 800° C. or less.

A total of 100 grams of metallic silicon was used in this experiment, of 99.2% purity, and the nitrogen gas used was of 99.99% purity. The flow rate of the nitrogen gas required to maintain the above specified pressures $P_1$ and $P_2$ was in fact 16 liters per minute, and the operation of the device was maintained for a period of 13 minutes. The resulting silicon nitride powder ($Si_3N_4$) had a nitrogen content of 37.8% and an average particle diameter of 0.22 microns. The crystalline configuration of the silicon nitride was almost wholly amorphous, and the geometrical configuration of the particles was mainly uniform spherical.

THE CONSTRUCTION OF THE SECOND APPARATUS EMBODIMENT

Figure 4:
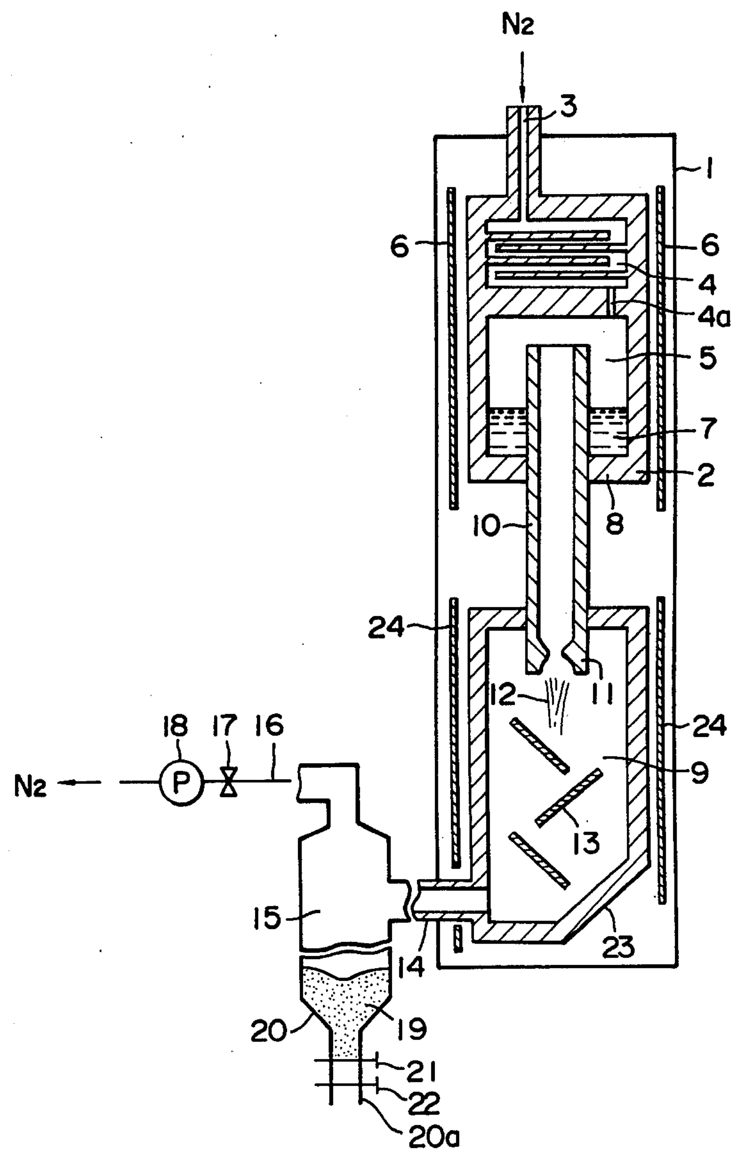
FIG. 4 is a schematic structural diagram, similar to FIG. 3, showing the second preferred embodiment of the apparatus for making a fine powder compound of a metal and another element according to the present invention.

In FIG. 4 there is shown a schematic structural view of an apparatus for making fine powder which is the second preferred embodiment of the apparatus of the present invention. In FIG. 4, parts which correspond to parts of the first preferred embodiment of the apparatus of the present invention shown in FIG. 3, and which have the same functions, are designated by the same reference numerals.

In this second preferred embodiment, the only difference is that the condensation chamber 9 is provided within a condensation furnace 23, which is kept hot by another heater 24. The convergent-divergent nozzle 11 of the conduit 10 opens within this condensation furnace 23, the deceleration plates 13 are provided as opposing the convergent-divergent nozzle 11 at the end of the conduit 10, and the conduit 14 for removing the fine powder produced opens from the lower portion of the condensation furnace 23. The heater 24 is for keeping the condensation furnace 23 at the second predetermined temperature $T_2$. Otherwise, this second preferred embodiment of the apparatus according to the present invention is the same as the first preferred embodiment shown in FIG. 3, and is operated similarly, with the addition of the operation of the heater 24. Because of the provision of the heater 24, the temperature $T_2$ of the condensation chamber 9 can be kept substantially higher in the case of this second preferred apparatus embodiment, than in the case of the first preferred apparatus embodiment of FIG. 3.

DESCRIPTION OF THE SECOND METHOD EMBODIMENT

The apparatus described above according to the second preferred embodiment of the apparatus of the present invention shown in FIG. 4 was operated by charging metallic silicon in the reaction chamber 5 of the melting pot 2, by operating the heater 6 and also the heater 24, and by injecting nitrogen gas ($N_2$) through the gas introduction port 3 to the gas preheating chamber 4. The temperature $T_1$ to which the melting pot 2 and the molten silicon metal pool 7 in the reaction chamber 5 thereof were heated was 2300° C., the temperature $T_2$ to which the condensation furnace 23 was heated was 1450° C., and the rate of flowing in of the nitrogen gas and the opening of the valve 17 and the suction of the vacuum pump 18 were controlled so as to keep the pressure $P_1$ within the reaction chamber 5 at approximately 20 torr (0.026 atmospheres) and so as to keep the pressure $P_2$ within the condensation chamber 9 at approximately 6 to 8 torr (0.0079 to 0.0105 atmospheres).

As explained above, the vaporized silicon produced by the boiling of the molten silicon pool 7 mixed within the reaction chamber 5 with the heated nitrogen gas flowing thereinto through the aperture 4*a*, and this mixture of silicon vapor and nitrogen gas, while reacting chemically, then flowed out through the conduit 10 and through the convergent-divergent nozzle 11 into the condensation chamber 9 defined within the condensation furance 24 with the adiabatically produced cooling being regulated (as was detected by measurement) to about a temperature of 1400° C. by the artificially maintained temperature $T_2$ of 1450° C. within the condensation chamber 9, in this second preferred embodiment, again attaining a supersonic speed as it passed through the convergent-divergent nozzle 11. A fine powder of silicon nitride particles condensed out of this reacting mixture gas and impinged against the deceleration plates 13, later being carried out of the condensation chamber 9 by the flow of excess nitrogen gas so as to be accumulated within the powder receiving chamber 15 and so as to be removed therefrom from time to time as explained above, while the excess nitrogen gas was removed by the vacuum pump 18 to be recycled.

Again, a total of 100 grams of metallic silicon was used in this experiment, of 99.2% purity, and the nitrogen gas used was of 99.99% purity. The flow rate of the nitrogen gas required to maintain the above specified pressures $P_1$ and $P_2$ was in fact again 16 liters per minute, and the operation of the device was again maintained for a period of 13 minutes. The resulting silicon nitride powder ($Si_3N_4$) had a nitrogen content of 38.9% and an average particle diameter of 0.65 microns. The crystalline configuration of the silicon nitride was about 88% alpha type, and the geometrical configuration of the particles was mainly uniform spherical.

DESCRIPTION OF THE THIRD METHOD EMBODIMENT

The same apparatus described above according to the second preferred embodiment of the apparatus of the present invention shown in FIG. 4 was again operated by charging metallic silicon in the reaction chamber 5 of the melting pot 2, by operating the heater 6 and also the heater 24, and by injecting nitrogen gas ($N_2$) through the gas introduction port 3 to the gas preheating chamber 4. The temperature $T_1$ to which the melting pot 2 and the molten silicon metal pool 7 in the reaction chamber 5 thereof were heated was again 2300° C., but this time the temperature $T_2$ to which the condensation furnace 23 was heated was lower, being approximately 1100° C., and the rate of flowing in of the nitrogen gas and the opening of the valve 17 and the suction of the vacuum pump 18 were controlled so as to keep the pressure $P_1$ within the reaction chamber 5 again at approximately 20 torr (0.026 atmospheres), but so as to keep the pressure $P_2$ within the condensation chamber 9 at a new lower pressure of approximately 4 to 5 torr (0.0053 to 0.0066 atmospheres).

As in the case of the second preferred method embodiment described above, the vaporized silicon produced by the boiling of the molten silicon pool 7 mixed within the reaction chamber 5 with the heated nitrogen gas flowing thereinto through the aperture 4a, and this mixture of silicon vapor and nitrogen gas, while reacting chemically, then flowed out through the conduit 10 and through the convergent-divergent nozzle 11 into the condensation chamber 9 defined within the condensation furnace 24 with the adiabatically produced cooling being regulated (as was detected by measurement) to about a new temperature, different from the temperature utilized in the second preferred method embodiment described above, of this time about 1000° C. to 1050° C., by the artificially maintained temperature $T_2$ within the condensation chamber 9, attaining a supersonic speed as it passed through the convergent-divergent nozzle 11. Again, a fine powder of silicon nitride particles condensed out of this reacting mixture gas and impinged against the deceleration plates 13, later being carried out of the condensation chamber 9 by the flow of excess nitrogen gas so as to be accumulated within the powder receiving chamber 15 and so as to be removed therefrom from time to time as explained above, while the excess nitrogen gas was removed by the vacuum pump 18 to be recycled.

Again, a total of 100 grams of metallic silicon was used in this experiment, of 99.2% purity, and the nitrogen gas used was of 99.99% purity. The flow rate of the nitrogen gas required to maintain the above specified pressures $P_1$ and $P_2$ was in fact again 16 liters per minute, and the operation of the device was again maintained for a period of 13 minutes. The resulting silicon nitride powder ($Si_3N_4$) again had a nitrogen content of 38.9%, but this time had an average particle diameter of 0.43 microns. The crystalline configuration of the silicon nitride was about 97% alpha type, this time, and again the geometrical configuration of the particles was mainly uniform spherical. Thus it is seen that, generally, the lower the temperature $T_2$ within the condensation chamber 9, the smaller are the particles of silicon nitride produced.

THE CONSTRUCTION OF THE THIRD APPARATUS EMBODIMENT

Figure 5:
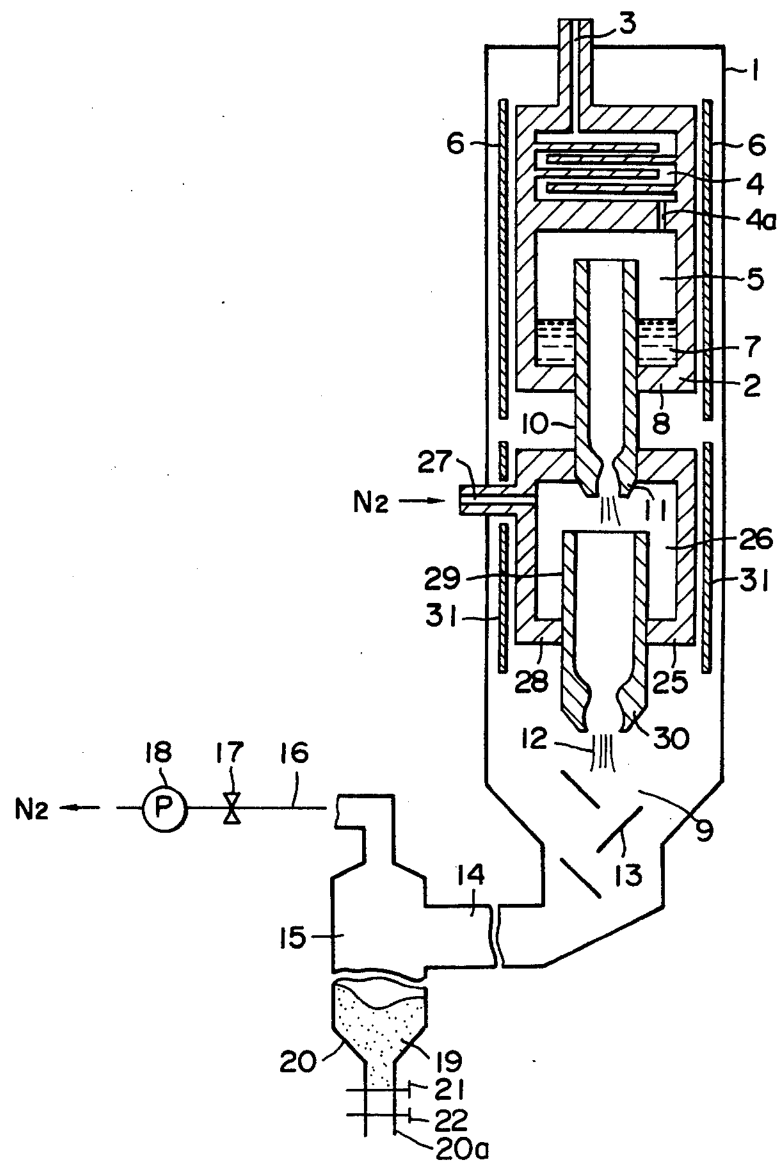
FIG. 5 is a schematic structural diagram, similar to FIGS. 3 and 4, showing the third preferred embodiment of the apparatus for making a fine powder compound of a metal and another element according to the present invention.

In FIG. 5 there is shown a schematic structural view of an apparatus for making fine powder which is the third preferred embodiment of the aparatus of the present invention. In fact, the construction of this third preferred embodiment will be described in detail, because it is substantially different from the construction of the first and second preferred embodiments. In FIG. 5, parts which correspond to parts of the first and second preferred embodiments of the apparatus of the present invention shown in FIGS. 3 and 4, and which have the same functions, are designated by the same reference numerals. In FIG. 5, the reference numeral 1 denotes a furnace shell which is substantially formed as a closed container, and a first melting pot or crucible 2 is provided within this furnace shell 1. The upper part of this first melting pot 2 is formed as a gas preheating chamber 4, which again is of a convoluted form for the sake of good heat transfer to the gas therein, to the upper part of which a first gas introduction port 3 is communicated; a pipe leads from this gas introduction port 3 to the outside. The lower part of the first melting pot 2 is formed as a first reaction chamber 5, and an opening 4a leads from the gas preheating chamber 4 to the first reaction chamber 5 to allow gas to flow therebetween. A first heater 6 is disposed generally around the first melting pot 2, so as to heat up the first melting pot 2 and the preheating chamber 4 and the first reaction chamber 5 formed therein.

The bottom 8 of the first reaction chamber 5 has a first conduit 10 set thereinto, and this first conduit 10 leads downwards to communicate the first reaction chamber 5 with a second reaction chamber 26 which is defined within a second melting pot or crucible 25 provided within the furnace shell 1 below the first melting pot 2. The lower end of this first conduit 10 is formed as a first convergent-divergent nozzle 11 of the above described sort. Into the second reaction chamber 26 there opens a second gas introduction port 27. A second heater 31 is disposed generally around the second melting pot 25, so as to heat up the second melting pot 25 and the second reaction chamber 26 formed therein.

The bottom 28 of the second reaction chamber 26 has a second conduit 29 set thereinto, and this second conduit 29 leads downwards to communicate the second reaction chamber 26 with a condensation chamber 9 defined within the furnace shell 1 below the second melting pot 25. Particularly according to the principle of the present invention, the lower end of this second conduit 29 is formed as a second convergent-divergent nozzle 30 of the above described sort. Within the condensation chamber 9, opposed to the second convergent-divergent nozzle 30, there are provided a plurality of deceleration plates 13. The lower end of the condensation chamber 9 is again communicated, via a conduit 14, with a powder collection chamber 15, to a middle portion of which said conduit 14 is communicated.

The upper part of the powder collection chamber 15 is again communicated, via a conduit 16 and a control valve 17, to a vacuum pump 18; and the lower part of the powder collection chamber 15 is formed as a powder reservoir 20, which is communicated, via a downwardly extending conduit 20a within which are set two valves 21 and 22, to the outside. Although it is not so shown, the gas sucked out by the vacuum pump 18 is again as a matter of practice recycled to be resupplied into the gas introduction port 3, for reasons of economical operation.

THE OPERATION OF THE THIRD APPARATUS EMBODIMENT

The apparatus according to the third preferred embodiment of the apparatus aspect of the present invention may be used in several different ways, as follows. In any case, metal is charged into the first reaction chamber 5 of the first melting pot 2, and then the first heater 6 is operated so as to heat up the first melting pot 2 and the metal charged therein to a predetermined temperature $T_1$, so as to melt this metal into a pool of molten metal 7, and so as further to boil said molten metal 7.

FIRST OPERATIONAL MODE OF THE THIRD APPARATUS EMBODIMENT

Now, in the first mode of operation of the shown apparatus according to the third preferred embodiment of the apparatus aspect of the present invention, gas of a single element is flowingly introduced through the first gas introduction port 3 into the gas preheating chamber 4, the flow rate of this gas introduction being determined as will be easily understood according to the control of the valve 17 which controls the removal of this gas from the other end of the apparatus by the action of the vacuum pump 18 which is being operated. This gas is heated up within the gas preheating chamber 4, and then passes in the heated state from the gas preheating chamber 4 in to the first reaction chamber 5, wherein it mixes with the vapor of the boiling metal 7 which is being emitted from the free surface thereof.

This mixture gas is then ejected from the first reaction chamber 5 according to the difference of pressures between the interior of the first reaction chamber 5 which is at a predetermined pressure $P_1$ and the interior of the second reaction chamber 26 which is at a pressure which is substantially lower than the pressure $P_1$ in the first reaction chamber 5 through the first conduit 10 and through the first convergent-divergent nozzle 11 at the lower end of said first conduit 10, and sprays out of the first convergent-divergent nozzle 11 as a jet, so as to be temporarily stored in the second reaction chamber 26, into which, in this first operational mode, no gas is supplied through the second gas introduction port 27. As this mixture gas passes through the first convergent-divergent nozzle 11, in a similar fashion to that explained previously it reaches a supersonic speed and expands adiabatically very quickly, while the metal vapor and the introduced gas react together chemically, and is substantially cooled in the adiabatic expansion process. Then, from the second reaction chamber 26, this mixture gas, which may now contain some metallic or metallic compound mist, is then further ejected according to the difference of pressures between the interior of the second reaction chamber 26 and the interior of the condensation chamber 9 which is maintained at another predetermined pressure $P_2$ which is substantially lower than the first predetermined pressure $P_1$ in the first reaction chamber 5 through the second conduit 29 and through the second convergent-divergent nozzle 30 at the lower end of said second conduit 29, and sprays out of the second convergent-divergent nozzle 30 as a jet 12 which impinges on the decelerating plates 13. As this mixture gas passes through the second convergent-divergent nozzle 30, in a similar fashion to that explained previously it reaches a supersonic speed and expands adiabatically very quickly, while the metal vapor and the introduced gas react together chemically, and is cooled down by this adiabatic expansion to a second temperature $T_2$, and the product of this reaction forms a fine powder by condensation caused by this cooling, said powder being a chemical compound of the metal 7 charged in the first reaction chamber 5 of the first melting pot 2 and of the gas injected through the first gas introduction port 3. The high rate of cooling of this reaction product ensures that the resulting powder is very fine and uniform and has good crystalline characteristics.

As before, the powder produced, after impinging on the deceleration plates 13 and being slowed down thereby from its aforesaid high speed, settles down to the bottom of the condensation chamber 13 and flows through the conduit 14 to collect as a powder heap 19 in the lower portion of the powder collecting chamber 15, this flow being aided by the excess gas, since more gas flow is provided via the first gas introduction port 3 into the apparatus than can be combined with the flow of metal vapor which is boiling off the free surface of the pool 7 of boiling metal in the first reaction chamber 5. This excess gas then passes out of the top of the powder collecting chamber 15 through the conduit 16 under the control of the valve 17, being sucked out of the apparatus by the operation of the vacuum pump 18. The sucking rate of the pump 18 and the opening amount of the valve 17 and the injection flow rate of the gas through the first gas introduction port 3 are again all controlled so as to maintain the pressures in the first reaction chamber 5 and in the condensation chamber 9 at substantially their respective predetermined desired values $P_1$ and $P_2$.

From time to time, some of the accumulated powder heap 19 in the bottom portion of the powder receiving chamber 15 is removed via the conduit **20*a*, by alternate operation of the valves 21 and 22** in a per se obvious fashion, without disturbing the depressurized state of the apparatus.

SECOND OPERATIONAL MODE OF THE THIRD APPARATUS EMBODIMENT

Next, in the second mode of operation of the shown apparatus according to the third preferred embodiment of the apparatus aspect of the present invention, no gas is flowingly introduced through the first gas introduction port 3 into the gas preheating chamber 4, but only vapor of the boiling metal 7 in the first reaction chamber 5 which is being emitted from the free surface thereof is ejected from the first reaction chamber 5 according to the difference of pressures between the interior of the first reaction chamber 5 and the interior of the second reaction chamber 26 which is at a pressure which is substantially lower than the pressure in the first reaction chamber 5 through the first conduit 10 and through the first convergent-divergent nozzle 11 at the lower end of said first conduit 10, and sprays out of the first convergent-divergent nozzle 11 as a jet, so as to be temporarily stored in the second reaction chamber 26. As this metallic vapor gas passes through the first convergent-divergent nozzle 11, in a similar fashion to that explained previously it reaches a supersonic speed and expands adiabatically very quickly, and is substantially cooled in the adiabatic expansion process. Into the second reaction chamber 25, in this second operational mode, a supply of gas is flowingly supplied through the second gas introduction port 27, so as to mix with said partially cooled metallic vapor. Then, from the second reaction chamber 26, this mixture gas, which may now contain some metallic or metallic compound mist, is then further ejected according to the difference of pressures between the interior of the second reaction chamber 26 and the interior of the condensation chamber 9 which is maintained at a pressure which is substantially lower than the pressure in the first reaction chamber 5 through the second conduit 29 and through the second convergent-divergent nozzle 30 at the lower end of said second conduit 29, and sprays out of the second convergent-divergent nozzle 30 as a jet 12 which impinges on the decelerating plates 13. As this mixture gas passes through the second convergent-divergent nozzle 30, in a similar fashion to that explained previously it reaches a supersonic speed and expands adiabatically very quickly, while the metal vapor and the introduced gas react together chemically, and is cooled down by this adiabatic expansion to a low temperature, and the product of this reaction forms a fine powder by condensation caused by this cooling, said powder being a chemical compound of the metal 7 charged in the first reaction chamber 5 of the first melting pot 2 and of the gas injected through the second gas introduction port 27. The high rate of cooling of this reaction product ensures that the resulting powder is very fine and uniform and has good crystalline characteristics.

As before, the powder produced settles down to the bottom of the condensation chamber 13 and flows through the conduit 14 to collect as a powder heap 19 in the lower portion of the powder collecting chamber 15, this flow being aided by the excess gas, since more gas flow is provided via the second gas introduction port 27 into the apparatus than can be combined with the flow of metal vapor which is boiling off the free surface of the pool 7 of boiling metal in the first reaction chamber 5. This excess gas then passes out of the top of the powder collecting chamber 15 through the conduit 16 under the control of the valve 17, being sucked out of the apparatus by the operation of the vacuum pump 18. Again, the sucking rate of the pump 18 and the opening amount of the valve 17 and the injection flow rate of the gas through the second gas introduction port 27 are again all controlled so as to maintain the pressures in the second reaction chamber 26 and in the condensation chamber 9 at substantially their respective predetermined desired values. Again, from time to time, some of the accumulated powder heap 19 in the bottom portion of the powder receiving chamber 15 is removed via the conduit 20*a*, by alternate operation of the valves 21 and 22, without disturbing the depressurized state of the apparatus.

THIRD OPERATIONAL MODE OF THE THIRD APPARATUS EMBODIMENT

Next, in the third mode of operation of the shown apparatus according to the third preferred embodiment of the apparatus aspect of the present invention, a first flow of gas of a single element is flowingly introduced through the first gas introduction port 3 into the gas preheating chamber 4, the flow rate of this gas introduction being determined as will be easily understood according to the control of the valve 17 which controls the removal of gas from the other end of the apparatus by the action of the vacuum pump 18 which is being operated. This first flow of gas is heated up within the gas preheating chamber 4, and then passes in the heated state from the gas preheating chamber 4 in to the first reaction chamber 5, wherein it mixes with the vapor of the boiling metal 7 which is being emitted from the free surface thereof.

This mixture gas is then ejected from the first reaction chamber 5 according to the difference of pressures between the interior of the first reaction chamber 5 which is at a predetermined pressure and the interior of the second reaction chamber 26 which is at a pressure which is substantially lower than the pressure in the first reaction chamber 5 through the first conduit 10 and through the first convergent-divergent nozzle 11 at the lower end of said first conduit 10, and sprays out of the first convergent-divergent nozzle 11 as a jet, so as to be temporarily stored in the second reaction chamber 26. As this mixture gas passes through the first convergent-divergent nozzle 11, in a similar fashion to that explained previously it reaches a supersonic speed and expands adiabatically very quickly, while the metal vapor and the introduced gas react together chemically, and is substantially cooled in the adiabatic expansion process. Into the second reaction chamber 25, in this third operational mode, a second supply of gas is flowingly supplied through the second gas introduction port 27, so as to mix with said partially cooled mixture of metallic vapor and the aforesaid first gas flow introduced through the first gas introduction port 3. Then, from the second reaction chamber 26, this mixture gas, which may now contain some metallic or metallic compound mist, is then further ejected according to the difference of pressures between the interior of the second reaction chamber 26 and the interior of the condensation chamber 9 which is maintained at a pressure which is substantially lower than the pressure in the first reaction chamber 5 through the second conduit 29 and through the second convergent-divergent nozzle 30 at the lower end of said second conduit 29, and sprays out of the second convergent-divergent nozzle 30 as a jet 12 which impinges on the decelerating plates 13. As this mixture gas passes through the second convergent-divergent nozzle 30, in a similar fashion to that explained previously it reaches a supersonic speed and expands adiabatically very quickly, while the metal vapor and the introduced gas further react together chemically, and is cooled down by this adiabatic expansion to a low temperature, and again the product of this reaction forms a fine powder by condensation caused by this cooling, said powder being a chemical compound of the metal 7 charged in the first reaction chamber 5 of the first melting pot 2 and of the gas injected through the second gas introduction port 27. The high rate of cooling of this reaction product again ensures that the resulting powder is very fine and uniform and has good crystalline characteristics.

As before, the powder produced settles down to the bottom of the condensation chamber 13 and flows through the conduit 14 to collect as a powder heap 19 in the lower portion of the powder collecting chamber 15, this flow being aided by the excess gas, since more gas flow is provided via the first and second second gas introduction ports 3 and 27 into the apparatus than can be combined with the flow of metal vapor which is boiling off the free surface of the pool 7 of boiling metal in the first reaction chamber 5. This excess gas then passes out of the top of the powder collecting chamber 15 through the conduit 16 under the control of the valve 17, being sucked out of the apparatus by the operation of the vacuum pump 18. Again, the sucking rate of the pump 18 and the opening amount of the valve 17 and the injection flow rate of the gas through the first and second gas introduction ports 3 and 27 are again all controlled so as to maintain the pressures in the first and second reaction chambers 5 and 25 and in the condensation chamber 9 at substantially their respective predetermined desired values. Again, from time to time, some of the accumulated powder heap 19 in the bottom portion of the powder receiving chamber 15 is removed via the conduit 20*a*, by alternate operation of the valves 21 and 22, without disturbing the depressurized state of the apparatus.

VARIANT OPERATIONAL MODES OF THE THIRD APPARATUS EMBODIMENT

The apparatus according to the third preferred embodiment of the apparatus aspect of the present invention may further be used in several other differenct ways, similar to the three operational modes discussed above, by further charging another supply of metal into the second reaction chamber 26 of the second melting pot 25, and then the second heater 31 is operated so as to heat up the second melting pot 25 and the metal charged therein to a predetermined temperature, so as to melt this metal into another pool of molten metal, and so as further to boil said molten metal. The vapor coming off the free surface of this boiling molten metal then mixes with the substance which is being ejected into the second reaction chamber 26 of the second melting pot 25, either only metal vapor and/or metal mist or metal vapor and/or metal mist and possibly metal/gas compound according to circumstances, and possibly also mixes with further gas if such further gas is being supplied through the second gas introduction port 27 again according to circumstances, and the resulting mixture is again further ejected according to the difference of pressures between the interior of the second reaction chamber 26 and the interior of the condensation chamber 9 which is maintained at a pressure which is substantially lower than the pressure in the first reaction chamber 5 through the second conduit 29 and through the second convergent-divergent nozzle 30 at the lower end of said second conduit 29, and sprays out of the second convergent-divergent nozzle 30 as a jet 12 which impinges on the decelerating plates 13. As this mixture gas passes through the second convergent-divergent nozzle 30, in a similar fashion to that explained previously it reaches a supersonic speed and expands adiabatically very quickly, while the metal vapor and the introduced gas further react together chemically, and is cooled down by this adiabatic expansion to a low temperature, and again the product of this reaction forms a fine powder by condensation caused by this cooling, said powder being a chemical compound of the metal 7 charged in the first reaction chamber 5 of the first melting pot 2 and of the gas injected through the second gas introduction port 27. The high rate of cooling of this reaction product again ensures that the resulting powder is very fine and uniform and has good crystalline characteristics. As before, the powder produced settles down to the bottom of the condensation chamber 13 and flows through the conduit 14 to collect as a powder heap 19 in the lower portion of the powder collecting chamber 15, this flow being aided by the excess gas, since more gas flow is provided via the first and/or the second gas introduction ports 3 and 27 into the apparatus than can be combined with the flow of metal vapor which is boiling off the free surface of the pool of boiling metal in the second reaction chamber 26 and possibly also the pool of boiling metal in the first reaction chamber 5. This excess gas then again passes out of the top of the powder collecting chamber 15 through the conduit 16 under the control of the valve 17, being sucked out of the apparatus by the operation of the vacuum pump 18. Again, the sucking rate of the pump 18 and the opening amount of the valve 17 and the injection flow rate of the gas through the first and/or the second gas introduction ports 3 and 27 are all controlled so as to maintain the pressures in the first and/or the second reaction chambers 5 and 26 and in the condensation chamber 9 at substantially their predetermined desired values. Again, from time to time, some of the accumulated powder heap 19 in the bottom portion of the powder receiving chamber 15 is removed via the conduit 20*a*, by alternate operation of the valves 21 and 22, without disturbing the depressurized state of the apparatus.

DESCRIPTION OF THE FOURTH METHOD EMBODIMENT

The apparatus described above according to the third preferred embodiment of the apparatus of the present invention was operated in its second above described operational mode by charging metallic aluminum in the first reaction chamber 5 of the first melting pot 2, by operating the first heater 6 in a controlled fashion, by closing the first gas introduction port 3, and by injecting nitrogen gas ($N_2$) through the second gas introduction port 27 to the second reaction chamber 26. The temperature $T_1$ to which the first melting pot 2 and the molten aluminum metal pool 7 in the first reaction chamber 5 thereof were heated was approximately 1900° C., and the amount of power supplied to the first heater 6 was controlled so as to keep the pressure $P_1$ within the first reaction chamber 5 at approximately 35 to 40 torr (0.046 to 0.053 atmospheres) and the rate of flowing in of the nitrogen gas and the opening of the valve 17 and the suction of the vacuum pump 18 were controlled so as to keep the pressure $P_2$ within the second reaction chamber 26 at approximately 5 torr (0.0066 atmospheres), with the power supply to the second heater 31 being regulated so as to keep the second reaction chamber 26 at a temperature $T_2$ of 600° to 700° C.

As explained above, the vaporized aluminum produced by the boiling of the molten aluminum pool 7 within the first reaction chamber 5 flowed out through the first conduit 10 and through the first convergent-divergent nozzle 11 into the second reaction chamber 26. As this aluminum vapor gas passed through the first convergent-divergent nozzle 11, as explained previously it reached a supersonic speed and expanded adiabatically very quickly, and was substantially cooled in the adiabatic expansion process, so as largely to become solidified into a fine aluminum mist. Then, this resulting product was mixed in said second reaction chamber 26 with the inflow of nitrogen gas. Then, from the second reaction chamber 26, this mixture gas was further ejected according to the difference of pressures between the interior of the second reaction chamber 26 and the interior of the condensation chamber 9 through the second conduit 29 and through the second convergent-divergent nozzle 30 at the lower end of said second conduit 29, and sprayed out of the second convergent-divergent nozzle 30 as a jet 12 which impinged on the decelerating plates 13. As this mixture gas passed through the second convergent-divergent nozzle 30, as explained previously it reached a supersonic speed and expanded adiabatically very quickly, while the aluminum metal vapor and the introduced nitrogen gas reacted together chemically to form aluminum nitride (AlN), and was cooled down by this adiabatic expansion to a low temperature, and the product of this reaction formed a fine aluminum nitride powder by condensation caused by this cooling, later being carried out of the condensation chamber 9 by the flow of excess nitrogen gas so as to be accumulated within the powder receiving chamber 15 and so as to be removed therefrom from time to time as explained above, while the excess nitrogen gas was removed by the vacuum pump 18 to be recycled. The high rate of cooling of this reaction product ensured that the resulting aluminum nitride powder was very fine and uniform and had good crystalline characteristics.

A total of 100 grams of metallic aluminum was used in this experiment, of 99.92% purity, and the nitrogen gas used was of 99.99% purity. The flow rate of the nitrogen gas required to maintain the specified pressures was in fact 18 liters per minute, and the operation of the device was maintained for a period of 17 minutes. The resulting aluminum nitride powder had a nitrogen content of 33.9% and an average particle diameter of 0.84 microns. The configuration of the aluminum nitride was almost wholly crystalline (amorphous 5%), and the geometrical configuration of the particles was mainly uniform spherical.

VARIATION OF THE THIRD APPARATUS EMBODIMENT

Figure 6:
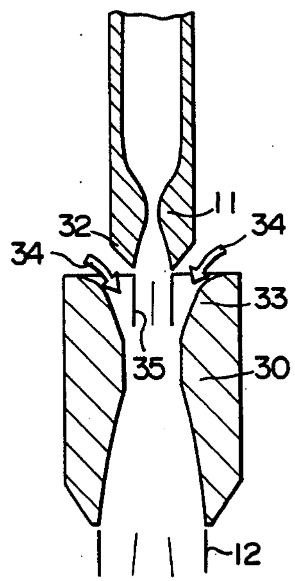
FIG. 6 is a schematic sectional view taken through two cooperating convergent-divergent nozzles, showing a possible modification which is applicable to the structure of the third preferred embodiment of the apparatus according to the present invention shown in FIG. 5.

Although the third device preferred embodiment as shown in FIG. 5 only has the end of the first convergent-divergent nozzle 11 opposing the inlet of the second conduit 29 at a certain distance away therefrom, as a variation it would be possible for the tip end portion 32 of the first convergent-divergent nozzle 11 to actually project into the upper end portion 33 of the second conduit 29, as illustrated in FIG. 6. In such a case, the jet flow 35 flowing at high speed out of the first convergent-divergent nozzle 11 directly into the second conduit 29 sucks in a flow of the gas or boiling metal (as the case may be) within the second reaction chamber 26, thereby ensuring good mixing action therefor.

VARIATIONS ON THE MATERIALS

Although the specifically discussed and described preferred embodiments of the present invention relate to the production of silicon nitride powder and aluminum nitride powder, in fact various other possible applications of the present invention are possible, such as the production of silicon carbide, titanium carbide, or the like.

Although the specifically discussed and described preferred embodiments of the present invention relate to the production of silicon nitride powder and aluminum nitride powder, in fact various other possible applications of the present invention are possible, such as the production of silicon carbide, titanium carbide, or the like.

Now, as will be understood from the above, the method of making fine powder according to the present invention is very effective for producing metallic compound fine powder of high purity and very fine particle diameter. However, the present inventors have, by conducting various experimental researches, determined that there is a way of specializing the present invention for production of even finer particles of metallic compound of even higher purity than in the above disclosed concrete preferred embodiments of the method of the present invention. In particular, it has appeared to the present inventors that, in the case of use of a convergent-divergent nozzle of the conventional type illustrated in FIG. 1 of the drawings in the preferred operational condition of proper expansion or over expansion as explained previously, an inefficiency occurs, in that since the speed of cooling of the gaseous mixture of the metallic vapor and the other element is very high—of the order of $10^6$° C. per second—a part of the gaseous mixture is continuously cooled without sufficient reaction and/or mixing occuring between the metal and the other element, and accordingly the purity of the resultant fine powder is somewhat limited. In fact, in the case of the production of silicon nitride as explained above, the nitrogen content of the resultant silicon nitride was only about 37.8% to 38.9%, as opposed to the theoretical value of 39.94%, and thus was only about 94.6% to 97.4% of the theoretical value. This shows that a certain amount of silicon was present in the fine powder particles, and accordingly that their purity was not extremely high.

After making numerous experimental researches on this subject, the present inventors have further determined that, by utilizing a particular form of convergent-divergent nozzle which has a constant cross sectional portion which extends axially for a distance equal to or greater than the minimum diameter of the convergent-divergent nozzle at its throat portion, instead of using a conventional type of convergent-divergent nozzle, the conversion of the gaseous mixture into a compound is much improved, resulting in a purer form of fine powder. Further, it has been discovered by the present inventors that the use of such a novel form of convergent-divergent nozzle results in much reduced particle size, thus producing finer metallic compound powder. It is considered that these beneficial effects are produced because the mixture of the metal vapor and/or mist and the other element which are passing through the convergent-divergent nozzle takes a certain time interval to pass along this constant cross sectional portion, and during this time period the reaction and/or mixing between the metal vapor and/or mist and the other element can progress further than in the case of a conventional convergent-divergent nozzle which does not have such a constant cross section portion. In fact, the purity of the resultant fine powder can be brought close to 100% by the use of such a novel form of convergent-divergent nozzle, as will be seen in what follows. Again, by suitably adjusting the parameters of the process such as the temperature and the pressure of the mixture before and after the adiabatic expansion through the convergent-divergent nozzle, it is possible to obtain metallic compound fine powder in various different required crystalline structures, such as amorphous, alpha type, and others.

Figure 8:
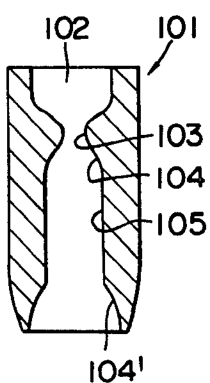
FIG. 8 is an axial sectional view, similar to FIG. 7, showing a convergent-divergent nozzle which has a constant cross sectional intermediate portion of greater diameter than its throat and downstream thereof.
Figure 9:
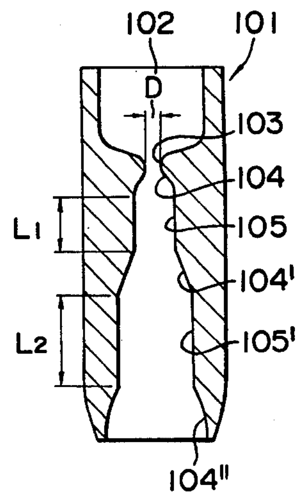
FIG. 9 is an axial sectional view, similar to FIGS. 7 and 8, showing a convergent-divergent nozzle which has a first constant cross sectional intermediate portion of greater diameter than its throat and downstream thereof, and a second constant cross sectional intermediate portion of greater diameter than said first constant cross sectional intermediate portion and downstream thereof.

First, a discussion will be made of the various forms of constant cross section portion type convergent-divergent nozzles shown in FIGS. 7 to 9, in comparison with the per se conventional convergent-divergent nozzle shown in FIG. 1. In these figures and in FIG. 1, parts which correspond and which have the same functions are designated by the same reference numerals.

CONSTANT CROSS SECTION PORTION TYPE DIVERGENT NOZZLES

Referring to FIG. 1, a per se conventional convergent-divergent nozzle 101 has, in order along its axis, an inlet portion 102, a minimum cross section portion or throat portion 103 toward while the inlet portion 102 converges, and an expansion portion 104. On the other hand, the convergent-divergent nozzle 101 shown in FIG. 7 has, in order along its axis, an inlet portion 102, a throat portion 103 toward which the inlet portion 102 converges, a constant cross section portion 105 of axial length L which is equal to or greater than the diameter of the throat portion 103 toward which the inlet portion 102 converges, and an expansion portion 104. The convergent-divergent nozzle 101 shown in FIG. 8 has, in order along its axis, an inlet portion 102, a throat portion 103, a first expansion portion 104, a constant cross section portion 105 of axial length L which is greater than the diameter of the throat portion 103, and a second expansion portion 104'. And the convergent-divergent nozzle 101 shown in FIG. 9 has, in order along its axis, an inlet portion 102, a throat portion 103, a first expansion portion 104, a first constant cross section portion 105 of axial length L, which is greater than the diameter of the throat portion 103, a second expansion portion 104', a second constant cross section portion 105' of axial length $L_2$ which is also greater than the diameter of the throat portion 103, and a third expansion portion 104''. In all cases, the constant cross section portion or portions are downstream of the throat portion 103 of the convergent-divergent nozzle. And in the first case shown in FIG. 7 the diameter of the constant cross section portion 105 is equal to the diameter of the throat portion 103, while in the other cases, since an expansion portion is interposed between the throat portion 103 and the constant cross section portion, the diameter of the constant cross section portion is greater than the diameter of the throat portion 103; and in the case of the convergent-divergent nozzle shown in FIG. 9 the diameter of the second constant cross section portion 105' is greater than the diameter of the first constant cross section portion 105. In fact, depending upon the particular properties and nature of the fine powder which is to be produced, such a convergent-divergent nozzle having even more than two constant cross sectional portions could be utilized.

The following opinions are held as to why this particular convergent-divergent nozzle configuration is so effective.

Figure 7:
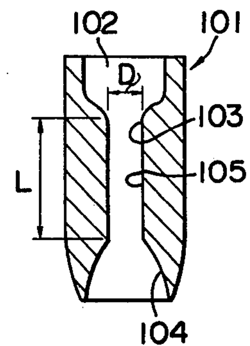
FIG. 7 is an axial sectional view of a convergent-divergent nozzle which has a constant cross sectional intermediate portion of the same diameter as its throat and downstream thereof.

As a mixture gas consisting of metal vapor and/or mist and the other element to be compounded therewith enters into the inlet portion 102 of the convergent-divergent nozzle 101 shown in FIG. 7, according to sucking on the outlet thereof, it reaches a supersonic speed in the region of the throat portion 103, then maintains this supersonic speed as it flows along the constant cross section portion 105 keeping a substantially steady state condition of temperature and pressure and thus reacting and/or mixing very well, and finally is adiabatically expanded in the expansion portion 104, being very quickly cooled by said expansion as explained previously. By this steady state interval of temperature and pressure produced by the provision of the constant cross section portion 104, the reaction and/or mixing of the metal vapor and/or mist and the other element is very well promoted. On the other hand, in the case of the convergent-divergent nozzle 101 shown in FIG. 8, since the first expansion portion 104 is provided between the throat portion 103 and the constant cross section portion 105, the mixture gas consisting of metal vapor and/or mist and the other element to be compounded therewith which has as described above attained a supersonic speed in the throat portion 103 is somewhat adiabatically expanded and thereby cooled in the first expansion portion 104, but not so much so as to stop it reacting and/or mixing, and also is imparted with a substantial turbulence involving cyclic small pressure changes in this adiabatic expansion process, due to a shock wave which is some cases is formed just before or upstream of the constant cross section portion 105, when the pressure ratio between the stagnation point pressure (inlet side pressure) and the back pressure is appropriate. Subsequently as it flows along the constant cross section portion 105 keeping a substantially steady state condition of temperature and pressure the mixture reacts and/or mixes even better, due to this turbulence. Thus by this steady state but turbulent interval of temperature and pressure produced by the provision of the constant cross section portion 105, the reaction and/or mixing of the metal vapor and/or mist and the other element is very well promoted. Finally, this reacting and/or mixing mixture is adiabatically expanded in the expansion portion 104, being very quickly cooled by said expansion as explained previously. On the other hand, in the case that the pressure ratio between the stagnation point pressure (inlet side pressure) and the back pressure is such that no such shock wave is formed just before or upstream of the constant cross section portion 105, then a substantially steady state but not particularly turbulent condition of temperature and pressure is maintained by the mixture gas as it passes along said constant cross section portion 105, and similarly to the operation in the case of the convergent-divergent nozzle of FIG. 7 by this steady state interval of temperature and pressure produced by the provision of the constant cross section portion 105 the reaction and/or mixing of the metal vapor and/or mist and the other element is very well promoted. Finally, in the case of the convergent-divergent nozzle 101 shown in FIG. 9, formed with several such constant cross section portions 105 and 105', the above described process in the case of the convergent-divergent nozzle of FIG. 8 is repeated several times. It has been confirmed by experiments made by the present inventors that these processes are effective, provided that the axial length or lengths of the constant cross section portion or portions is equal to or greater than the diameter D of the throat 103 of the convergent-divergent nozzle 101.

Figure 10:
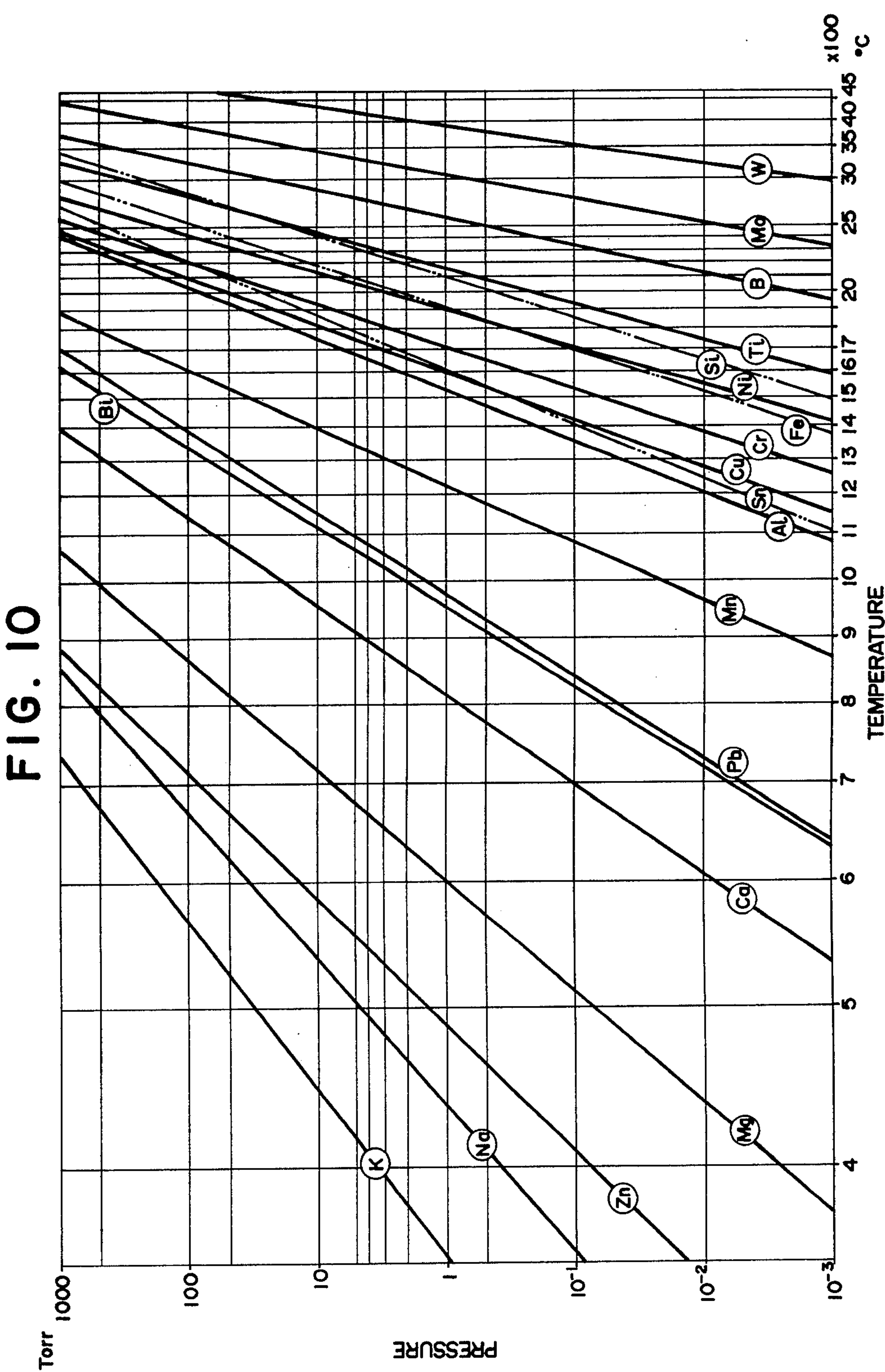
FIG. 10 is a vapor pressure diagram showing the relation between temperature and vapor pressure of various metals.

Now, as shown in FIG. 10, the vapor pressures of different metals differ widely. The tendencies to react to oxygen, nitrogen, or carbon of different metals also differ widely, and the pressure and temperature conditions under which mixtures of various metal vapors and such elements are stable as mixtures or as chemical combinations such as oxides, nitrides, or carbides are also diverse. Further, the free energy of various compounds varies even under the same temperature and pressure conditions, and accordingly the behavior of the composition and reaction of various compounds is different even under the same temperature and pressure conditions. Therefore, when a mixture gas at a high temperature of a metallic vapor and/or mist and another element is converted into a compound in fine powder form by being rapidly cooled by being passed through a convergent-divergent nozzle with a constant cross section portion as described above, by properly selecting not only the temperature and the pressure conditions before and after the convergent-divergent nozzle but also the position and the axial length of the constant cross sectional portion, according to the tendency of the metal and the other element to be combined and/or mixed and according to the temperature and pressure conditions of stability of the resulting compound, the conversion into compound of the metallic gas and/or vapor and the other element can be well promoted, and this allows for the production of metallic compound in fine particle or powder form having very high purity and also very uniform and fine particle size, by fully taking advantage of the possibilities for varying the shape of the convergent-divergent nozzle according to its functions as described above.

THE CONSTRUCTION OF THE FOURTH APPARATUS EMBODIMENT

In FIG. 11, there is partially and rather schematically shown an apparatus for making fine powder which is a fourth preferred embodiment of the apparatus of the present invention. In FIG. 11, parts which correspond to parts of the third preferred embodiment of the apparatus of the present invention shown in FIG. 5, and which have the same functions, are designated by the same reference numerals.

In this fourth preferred embodiment, the only differences from the third preferred embodiment shown in FIG. 5 are that, first, two first gas introduction ports 3*a* and 3*b* are provided as opening to the first reaction chamber 5; and second, the both of the convergent-divergent nozzles 11 and 30 are formed with constant cross sectional portions, and are of the type shown in detail in FIG. 7. Otherwise, this fourth preferred embodiment of the apparatus according to the present invention is the same as the third preferred embodiment shown in FIG. 5.

The two gas introduction ports 3*a* and 3*b* are provided in order to be able to introduce the metallic vapor from the outside of the apparatus, if required, and in order to be able to thus introduce two different sorts of metallic vapor in order to be able to form an alloy thereof as will be seen shortly as an operational example. The temperature and the pressure conditions before and after the first and second convergent-divergent nozzles 11 and 30 are selected, as well as the shapes and dimensions of the convergent-divergent nozzles 11 and 30, including the positions and the axial lengths of their constant cross sectional portions, according to the nature of the materials to be used and the desired end product. The temperatures of the first and second reaction chambers 5 and 26 are kept at $T_1$ and $T_2$ respectively; and the pressures of the first and second reaction chambers 5 and 26 and the condensing chamber 9 are kept at $P_1$, $P_2$, and $P_3$ respectively.

THE OPERATION OF THE FOURTH APPARATUS EMBODIMENT

The apparatus according to the fourth preferred embodiment of the apparatus aspect of the present invention may be used in several different ways, as follows.

(1) FIRST OPERATIONAL MODE OF THE FOURTH APPARATUS EMBODIMENT

Now, in the first mode of operation of the shown apparatus according to the fourth preferred embodiment of the apparatus aspect of the present invention, gas A(metal vapor) is flowingly introduced through the first gas introduction port 3*a* into the first reaction chamber 5 (ignoring any gas preheating chamber for the purposes of explanation), and another gas B is provided into this first reaction chamber 5 either via the second gas introduction port 3*b* or by boiling metal in the first reaction chamber 5. These gases A and B then mix, and this mixture gas is then ejected from the first reaction chamber 5 according to the difference of pressures between the interior of the first reaction chamber 5 which is at the predetermined pressure $P_1$ and the interior of the second reaction chamber 26 which is at the predetermined pressure $P_2$ which is lower than the pressure $P_1$ through the first convergent-divergent nozzle 11, and sprays out of the first convergent-divergent nozzle 11 as a jet, so as to be temporarily stored in the second reaction chamber 26, into which, in this first operational mode, no gas is supplied through the second gas introduction port 27. As this mixture gas passes through the first convergent-divergent nozzle 11, in a similar fashion to that explained previously it reaches a supersonic speed and expands adiabatically very quickly, while gas A and gas B react or mix together, and is substantially cooled in the adiabatic expansion process. Then, from the second reaction chamber 26, this mixture gas, which may now contain some metallic or metallic compound or alloy mist, is then further ejected according to the difference of pressures between the interior of the second reaction chamber 26 and the interior of the condensation chamber 9 which is maintained at the predetermined pressure $P_3$ which is substantially lower than the second predetermined pressure $P_2$ in the second reaction chamber 26 through the second convergent-divergent nozzle 30, and sprays out of the second convergent-divergent nozzle 30 as a jet which impinges on the decelerating plates 13. As this mixture gas passes through the second convergent-divergent nozzle 30, in a similar fashion to that explained previously it reaches a supersonic speed and expands adiabatically very quickly, while gas A and gas B react or mix together, and is cooled down by this adiabatic expansion to the second temperature $T_2$, and the product of this reaction forms a fine powder by condensation caused by this cooling, said powder being a chemical compound or alloy of the gas A and gas B. The high rate of cooling of this reaction product ensures that the resulting powder is very fine and uniform and has good crystalline characteristics. In fact, this operational mode could be performed by a device which did not incorporate any second reaction chamber such as 26 or any second convergent-divergent nozzle 11, but was similar in its construction to the construction of the first and second preferred embodiments.

SECOND OPERATIONAL MODE OF THE FOURTH APPARATUS EMBODIMENT

Next, in the second mode of operation of the shown apparatus according to the fourth preferred embodiment of the apparatus aspect of the present invention, only one gas A, metallic vapor, is provided into the first reaction chamer 5, again either by being fed in via the second gas introduction port 3*b* or by boiling metal in the first reaction chamber 5. This gas (not a mixture) is ejected from the first reaction chamber 5 according to the difference of pressures between the interior of the first reaction chamber 5 and the interior of the second reaction chamber 26 through the first convergent-divergent nozzle 11 and sprays out of the first convergent-divergent nozzle 11 as a jet, so as to be temporarily stored in the second reaction chamber 26. As this metallic vapor gas passes through the first convergent-divergent nozzle 11, in a similar fashion to that explained previously it reaches a supersonic speed and expands adiabatically very quickly, and is substantially cooled in the adiabatic expansion process. Into the second reaction chamber 26, in this second operational mode, a supply of a gas C is flowingly supplied through the second gas introduction port 27, so as to mix with said partially cooled metallic vapor. Then, from the second reaction chamber 26, this mixture gas, which may now contain some metallic or metallic compound or alloy mist, is then further ejected according to the difference of pressures between the interior of the second reaction chamber 26 and the interior of the condensation chamber 9 through the second convergent-divergent nozzle 30, and sprays out of the second convergent-divergent nozzle 30 as a jet which impinges on the decelerating plates 13. As this mixture gas passes through the second convergent-divergent nozzle 30, in a similar fashion to that explained previously it reaches a supersonic speed and expands adiabatically very quickly, while the metal vapor A and the introduced gas C react together chemically or become mixed or alloyed, and is cooled down by this adiabatic expansion to a low temperature, and the product of this reaction forms a fine powder by condensation caused by this cooling, said powder being a chemical compound or an alloy of gas A and gas C. The high rate of cooling of this reaction product ensures that the resulting powder is very fine and uniform and has good crystalline characteristics. As a variation of this method, the gas C could be produced in the second reaction chamber 26 by boiling of metal therein, rather than by injection.

THIRD OPERATIONAL MODE OF THE FOURTH APPARATUS EMBODIMENT

Next, in the third mode of operation of the shown apparatus according to the fourth preferred embodiment of the apparatus aspect of the present invention, gas A is flowingly introduced through the first gas introduction port *3a* into the first reaction chamber 5 (ignoring any gas preheating chamber for the purposes of explanation), and another gas B is provided into this first reaction chamber 5 either via the second gas introduction port *3b* or by boiling metal in the first reaction chamber 5. These gases A and B then mix, and this mixture gas is then ejected from the first reaction chamber 5 according to the difference of pressures between the interior of the first reaction chamber 5 which is at the predetermined pressure $P_1$ and the interior of the second reaction chamber 26 which is at the predetermined pressure $P_2$ which is lower than the pressure $P_1$ through the first convergent-divergent nozzle 11, and sprays out of the first convergent-divergent nozzle 11 as a jet, so as to be temporarily stored in the second reaction chamber 26. Into the second reaction chamber 26, in this third operational mode, a third supply of gas C is flowingly supplied through the second gas introduction port 17, so as to mix with said partially cooled mixture from the first reaction chamber 5. Then, from the second reaction chamber 26, this mixture gas, which may now contain some metallic or metallic compound or alloy mist, is then further ejected according to the difference of pressures between the interior of the second reaction chamber 26 and the interior of the condensation chamber 9 which is maintained at a pressure which is substantially lower than the pressure in the second reaction chamber 26 through the the second convergent-divergent nozzle 30, and sprays out of the second convergent-divergent nozzle 30 as a jet which impinges on the decelerating plates 13. As this mixture gas passes through the second convergent-divergent nozzle 30, in a similar fashion to that explained previously it reaches a supersonic speed and expands adiabatically very quickly, while the three gases A, B, and C further react together chemically or become further mixed and/or alloyed, and is cooled down by this adiabatic expansion to a low temperature, and again the product of this reaction or mixing or alloying forms a fine powder by condensation caused by this cooling, said powder being a chemical compound or mixture or alloy of the three gases A, B, and C. The high rate of cooling of this reaction product again ensures that the resulting powder is very fine and uniform and has good crystalline characteristics. Again, as a variation of this method, the gas C could be produced in the second reaction chamber 26 by boiling of metal therein, rather than by injection.

CHOICE OF OPERATIONAL METHOD

Now guidelines will be given as to which of these three operational methods should be used in various cases of combination of materials to be compounded or alloyed.

(1) MAKING A FINE POWDER OF A METAL MIXTURE OR A METAL-METAL COMPOUND

In this case, the above described second mode of operation is used. In other words, the metals are alloyed or compounded properly by appropriately determining the temperatures $T_1$ and $T_2$ of the first and the second reaction chambers 5 and 26 by taking into account the vapor pressures $P_1$ and $P_2$ of the metals.

(2) MAKING A FINE POWDER OF A METAL-NON METAL COMPOUND

In this case, either the first or the second above described mode of operation is used. The first mode of operation is used when the production temperature region of the metal-non metal compound is between the temperatures $T_1$ and $T_2$ of the first and the second reaction chambers 5 and 26, while the second mode of operation is used when the production temperature region of the metal-non metal compound is below the temperature $T_2$ of the second reaction chamber 26.

(3) MAKING A FINE POWDER OF A MIXTURE OF A METAL AND A METAL-NON METAL COMPOUND

In this case, the above described third mode of operation is used. In other words, a mixture gas produced by mixing in the first reaction chamber 5, consisting of gas A, a metallic vapor, and gas B, a non metallic gas, is subjected to reaction as it is ejected into the second reaction chamber 26 through the first convergent-divergent nozzle 11, and then is mixed with the third gas C, a metallic vapor, and then this mixture gas is further subjected to alloying as it is ejected into the condensation chamber 9 through the second convergent-divergent nozzle 30.

(4) MAKING A FINE POWDER OF A MIXTURE OF A METAL-METAL COMPOUND AND A METAL-NON METAL COMPOUND

In this case, again, the above described third mode of operation is used. In other words, a mixture gas produced by mixing in the first reaction chamber 5, consisting of gas A, a metallic vapor, and gas B, also a metallic vapor, is subjected to reaction as it is ejected into the second reaction chamber 26 through the first convergent-divergent nozzle 11, and then is mixed with the third gas C, a non metallic gas, and then this mixture gas is further subjected to alloying as it is ejected into the condensation chamber 9 through the second convergent-divergent nozzle 30.

According to any one of the above described methods, it is possible to produce a fine powder of high purity and of either amorphous or crystalline configuration. Further, depending upon the specific combination of gases involved, it is even possible to produce a solid solution of the above described metal-metal compounds.

A VARIANT STRUCTURE FOR THE NOZZLE

Now, if the nozzle is in fact provided with a special side gas supply port 124, as shown schematically in FIG. 12, which is a modification of the nozzle shown in FIG. 7, then the apparatus of the present invention can be much simplified, by omitting the second reaction chamber 26 and the second convergent-divergent nozzle 30. This sort of variant nozzle could, according to need, be used as the second convergent-divergent nozzle 30 of the third preferred embodiment of the apparatus according to the present invention described above. In FIG. 12, the portions corresponding to those in FIG. 7 are designated by the same reference numerals. The concept of inserting the outlet end of the first convergent-divergent nozzle 11 into the inlet end of the second convergent-divergent nozzle 30, in a manner similar to that shown in FIG. 6, is applicable also to these new forms of convergent-divergent nozzle shown in FIGS. 7, 8, and 9. Again, in this case, the second reaction chamber 26 may be omitted. Thus, by proper selection of the operating conditions of the nozzles, the temperature $T_2$ can be selected as the required temperature, thus making the operation of the device even simpler.

DESCRIPTION OF THE FIFTH METHOD EMBODIMENT

An apparatus substantially similar to the apparatus described earlier above according to the first preferred embodiment of the apparatus of the present invention shown in FIG. 3, except for including a convergent-divergent nozzle 11 of the form shown in FIG. 7 in which the axial dimension of the constant cross section portion was about four times as great as the diameter of the throat or the narrowest portion, was operated by charging metallic silicon in the reaction chamber 5 of the melting pot 2, by operating the heater 6, and by injecting nitrogen gas ($N_2$) through the gas introduction port 3 to the gas preheating chamber 4. The temperature $T_1$ to which the melting pot 2 and the molten silicon metal pool 7 in the reaction chamber 5 thereof were heated was 2300° C., and the rate of flowing in of the nitrogen gas and the opening of the valve 17 and the suction of the vacuum pump 18 were controlled so as to keep the pressure $P_1$ within the reaction chamber 5 at approximately 20 torr (0.026 atmospheres) and so as to keep the pressure $P_2$ within the condensation chamber 9 at approximately 5 to 6 torr (0.0066 to 0.0079 atmospheres).

In a similar fashion to that explained above with respect to the first preferred method embodiment of the present invention, except for the difference in the operation of the convergent-divergent nozzle 11 caused by its structure, as explained above, the vaporized silicon produced by the boiling of the molten silicon pool 7 mixed within the reaction chamber 5 with the heated nitrogen gas flowing thereinto through the aperture 4a, and this mixture of silicon vapor and nitrogen gas, while reacting chemically, then flowed out through the conduit 10 and through the convergent-divergent nozzle 11 into the condensation chamber 9, attaining a supersonic speed as it passed through the convergent-divergent nozzle 11. A fine powder of silicon nitride particles condensed out of this reacting mixture gas and impinged against the deceleration plates 13, later being carried out of the condensation chamber 9 by the flow of excess nitrogen gas so as to be accumulated within the powder receiving chamber 15 and so as to be removed therefrom from time to time as explained above, while the excess nitrogen gas was removed by the vacuum pump 18 to be recycled. The temperature $T_2$ to which the mixture gas was cooled by the adiabatic expansion within the convergent-divergent nozzle 11 as it emerged into the condensation chamber 9 was about 800° C. or less.

A total of 100 grams of metallic silicon was used in this experiment, of 99.2% purity, and the nitrogen gas used was of 99.99% purity. The flow rate of the nitrogen gas required to maintain the above specified pressures $P_1$ and $P_2$ was in fact 16 liters per minute, and the operation of the device was maintained for a period of 13 minutes. The resulting silicon nitride powder ($Si_3N_4$) had a nitrogen content of 39.3% and an average particle diameter of 0.41 microns. The crystalline configuration of the silicon nitride was almost wholly amorphous, and the geometrical configuration of the particles was mainly uniform spherical.

It will be understood from this that the use of the new form of convergent-divergent nozzle 11 as shown in FIG. 7 had a very beneficial effect upon the purity of the resulting silicon nitride, the nitrogen content of which was much closer to the theoretical value of 39.94% than in the case of the first preferred embodiment described.

DESCRIPTION OF THE FIFTH METHOD EMBODIMENT

An apparatus substantially similar to the apparatus described earlier above according to the third preferred embodiment of the apparatus of the present invention, except for the fact that the second convergent-divergent nozzle 30 was of the form shown in FIG. 7 in which the axial dimension of the constant cross sectional portion was about three times as great as the diameter of the throat or the narrowest portion, (the first convergent-divergent nozzle was of the per se conventional sort shown in FIG. 1) was operated by charging metallic nickel in the first reaction chamber 5 of the first melting pot 2, by closing the first gas introduction port 3, by operating the first heater 6 in a controlled fashion, and by charging metallic aluminum in the second reaction chamber 26 of the second melting pot 25, and by operating the second heater 31 in a controlled fashion. The temperature $T_1$ to which the first melting pot 2 and the molten nickel metal pool 7 in the first reaction chamber 5 thereof were heated was approximately 2300° C., and the temperature $T_2$ to which the second melting pot 25 and the molten aluminum metal pool in the second reaction chamber 26 thereof were heated was approximately 1800° C. Then argon gas was flowed in through the first gas introduction port 3 as a carrier gas, and the amount of power supplied to the first heater 6 was controlled so as to keep the pressure $P_1$ within the first reaction chamber 5 at approximately 35 torr (0.046 atmospheres) and the rate of flowing in of the argon gas and the opening of the valve 17 and the suction of the vacuum pump 18 were controlled so as to keep the pressure $P_2$ within the second reaction chamber 26 at approximately 10 torr (0.0132 atmospheres).

As explained above, the vaporized nickel produced by the boiling of the molten nickel pool 7 within the first reaction chamber 5 flowed out (together with the argon carrier gas) through the first conduit 10 and through the first convergent-divergent nozzle 11 into the second reaction chamber 26. As this nickel vapor gas passed through the first convergent-divergent nozzle 11, as explained previously it reached a supersonic speed and expanded adiabatically very quickly, and was substantially cooled in the adiabatic expansion process, so as largely to become solidified into a fine nickel mist. Then, this resulting product was mixed in said second reaction chamber 26 with the aluminum vapor therein produced by the boiling of the aluminum. Then, from the second reaction chamber 26, this mixture gas was further ejected according to the difference of pressures between the interior of the second reaction chamber 26 and the interior of the condensation chamber 9 (which was kept at about 0.5 to 1 torr) through the second conduit 29 and through the second convergent-divergent nozzle 30 at the lower end of said second conduit 29, and sprayed out of the second convergent-divergent nozzle 30 as a jet which impinged on the decelerating plates 13. As this mixture gas passed through the second convergent-divergent nozzle 30, as explained previously it reached a supersonic speed and expanded adiabatically very quickly, while the nickel metal vapor and/or mist and the aluminum metal vapor alloyed themselves together to form nickel-aluminum alloy ($Al_xNi_y$) and were cooled down by this adiabatic expansion to a low temperature, and the product of this reaction formed a fine nickel-aluminum alloy powder by condensation caused by this cooling, later being carried out of the condensation chamber 9 by the flow of argon gas so as to be accumulated within the powder receiving chamber 15 and so as to be removed therefrom from time to time as explained above, while the argon gas was removed by the vacuum pump 18 to be recycled. The high rate of cooling of this reaction product ensured that the resulting nickel-aluminum alloy powder was very fine and uniform and had good crystalline characteristics.

A total of 200 grams of metallic nickel was used in this experiment, of 99.3% purity, and a total of 31 grams of metallic aluminum was used, of 99.3% purity. The flow rate of the argon gas required to maintain the specified pressures was in fact 3 liters per minute, and the operation of the device was maintained for a period of 18 minutes. The resulting nickel-aluminum alloy powder had a nickel-aluminum alloy content ($Al_xNi_y$) of 74%, a nickel content of 16%, and an aluminum content of 10%. The average particle diameter was 0.08 microns. The configuration of the nickel-aluminum alloy was almost wholly amorphous (90% or more) and the geometrical configuration of the particles was almost entirely uniform spherical. The material had electric and magnetic properties which are not found in conventional aluminum-nickel alloys.

Further, after making other experimental researches, the present inventors have also determined that, by utilizing a particular form of convergent-divergent nozzle which has several expansion portions, instead of using a conventional type of convergent-divergent nozzle, the conversion of the gaseous mixture into a compound is also much improved, resulting in a purer form of fine powder. Again, it has been discovered by the present inventors that the use of such a novel form of convergent-divergent nozzle results in much reduced particle size, thus producing finer metallic compound powder. It is considered that these beneficial effects are produced because the mixture of the metal vapor and/or mist and the other element which are passing through the convergent-divergent nozzle are imparted with considerably strong turbulence in the second and any subsequent expansion regions, due to the shock waves produced in the first expansion region. In fact, the purity of the resultant fine powder can be brought close to 100% by the use of such another novel form of convergent-divergent nozzle, as will be seen in what follows. Again, by suitably adjusting the parameters of the process such as the temperature and the pressure of the mixture before and after the adiabatic expansion through the convergent-divergent nozzle, it is possible to obtain metallic compound fine powder in various different required crystalline structures, such as amorphous, alpha type, and others.

First, a discussion will be made of the various forms of multiple expansion region type convergent-divergent nozzles shown in FIGS. 8, 9, 13, and 14, in comparison with the per se conventional convergent-divergent nozzle shown in FIG. 1. In these figures and in FIGS. 1 and 7, parts which correspond and which have the same functions are designated by the same reference numerals.

MULTIPLE EXPANSION PORTION TYPE DIVERGENT NOZZLES

The convergent-divergent nozzle 101 shown in FIG. 13 is composed of two throat and expansion portion or nozzle combinations 106 and 107, and has, in order along its axis, an inlet portion 102, a first throat portion 103 toward which the inlet portion 102 converges, a first expansion portion 104, a second throat portion 103' toward which the downstream end of the first expansion portion 104 converges, and a second expansion portion 104'. And the convergent-divergent nozzle 101 shown in FIG. 14 is composed of three throat and expansion portion or nozzle combinations 106, 107, and 108, and has, in order along its axis, an inlet portion 102, a first throat portion 103 toward which the inlet portion 102 converges, a first expansion portion 104, a second throat portion 103' toward which the downstream end of the first expansion portion 104 converges, a second expansion portion 104', a third throat portion 103' toward which the downstream end of the second expansion portion 104' converges, and a third expansion portion 104''. Further, the convergent-divergent nozzle shown in FIG. 8, and also the convergent-divergent nozzle shown in FIG. 9, are also examples of this sort of convergent-divergent nozzle, each having several expansion portions, although in contrast to the convergent-divergent nozzles of FIGS. 13 and 14 these convergent-divergent nozzles do not have multiple throats. In fact, depending upon the particular properties and nature of the fine powder which is to be produced, such a convergent-divergent nozzle having even more than three expansion portions could be utilized.

The following opinions are held as to why this particular convergent-divergent nozzle configuration is so effective.

As a mixture gas consisting of metal vapor and/or mist and the other element to be compounded therewith enters into the inlet portion 102 of the convergent-divergent nozzle 101 shown in FIG. 13, according to sucking on the outlet thereof, it reaches a supersonic speed in the region of the first throat portion 103, then is adiabatically expanded in the first expansion portion 104, being very quickly cooled by said expansion as explained previously, but not so much as to stop it reacting and/or mixing. Provided that a shock wave is formed just before or upstream of the second throat portion 103', which can be ensured to occur when the pressure ratio between the stagnation point pressure (inlet side pressure) and the back pressure is appropriate according to proper tailoring of the operational parameters of the device, strong turbulence will be generated in the mixture gas just as it enters the second throat portion 103'. This high turbulence persists as the mixture gas flows through the second throat portion 103' and through the second expansion portion 104'. By this high turbulence of the mixture gas, the reaction and/or mixing of the metal vapor and/or mist and the other element is very well promoted. Finally, this reacting and/or mixing mixture is adiabatically expanded in the second expansion portion 104', being very quickly cooled by said expansion as explained previously. In the case of the convergent-divergent nozzle 101 shown in FIG. 14, since it is formed with more than two such expansion portions, the above described process in the case of the convergent-divergent nozzle of FIG. 13 is repeated several times. It has been confirmed by experiments made by the present inventors that these processes are effective, as will be seen hereinafter.

DESCRIPTION OF THE SEVENTH METHOD EMBODIMENT

An apparatus substantially similar to the apparatus described earlier above according to the first preferred embodiment of the apparatus of the present invention, except for including a convergent-divergent nozzle 11 of the form shown in FIG. 13 which had two expansion portions 104 and 104', was operated by charging metallic silicon in the reaction chamber 5 of the melting pot 2, by operating the heater 6, and by injecting nitrogen gas ($N_2$) through the gas introduction port 3 to the gas preheating chamber 4. The temperature $T_1$ to which the melting pot 2 and the molten silicon metal pool 7 in the reaction chamber 5 thereof were heated was 2300° C., and the rate of flowing in of the nitrogen gas and the opening of the valve 17 and the suction of the vacuum pump 18 were controlled so as to keep the pressure $P_1$ within the reaction chamber 5 at approximately 20 torr (0.026 atmospheres) and so as to keep the pressure $P_2$ within the condensation chamber 9 at approximately 5 to 6 torr (0.0066 to 0.0079 atmospheres).

In a similar fashion to that explained above with respect to the first preferred method embodiment of the present invention, except for the difference in the operation of the convergent-divergent nozzle 11 caused by its structure, as explained above, the vaporized silicon produced by the boiling of the molten silicon pool 7 mixed within the reaction chamber 5 with the heated nitrogen gas flowing thereinto through the aperture 4*a*, and this mixture of silicon vapor and nitrogen gas, while reacting chemically, then flowed out through the conduit 10 and through the convergent-divergent nozzle 11 into the condensation chamber 9, attaining a supersonic speed as it passed through the convergent-divergent nozzle 11. A fine powder of silicon nitride particles condensed out of this reacting mixture gas and impinged against the deceleration plates 13, later being carried out of the condensation chamber 9 by the flow of excess nitrogen gas so as to be accumulated within the powder receiving chamber 15 and so as to be removed therefrom from time to time as explained above, while the excess nitrogen gas was removed by the vacuum pump 18 to be recycled. The temperature $T_2$ to which the mixture gas was cooled by the adiabatic expansion within the convergent-divergent nozzle 11 as it emerged into the condensation chamber 9 was about 800° C. or less.

A total of 100 grams of metallic silicon was used in this experiment, of 99.2% purity, and the nitrogen gas used was of 99.99% purity. The flow rate of the nitrogen gas required to maintain the above specified pressures $P_1$ and $P_2$ was in fact 16 liters per minute, and the operation of the device was maintained for a period of 13 minutes. The resulting silicon nitride powder ($Si_3N_4$) had a nitrogen content of 39.2% and an average particle diameter of 0.72 microns. The crystalline configuration of the silicon nitride was almost wholly amorphous, and the geometrical configuration of the particles was mainly uniform spherical.

It will be understood from this that the use of the new form of convergent-divergent nozzle 11 as shown in FIG. 13 had a very beneficial effect upon the purity of the resulting silicon nitride, the nitrogen content of which was much closer to the theoretical value of 39.94% than in the case of the first preferred embodiment described.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular preferred embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A method of making a fine powder of a metal and a second element in an intimate mutual relation, which comprises: passing a gaseous mixture of said metal and said second element through a convergent-divergent nozzle; and rapidly cooling said gaseous mixture by adiabatic expansion.

2. A method according to claim 1, wherein said metal and said second element form a chemical compound.

3. A method according to claim 2, wherein said other element is non metallic.

4. A method according to claim 1, wherein said second element is also a metal, and wherein said metal and said second element form an alloy.

5. A method of making a fine powder of a metal and a second element in an intimate mutual relation, which comprises:

passing said metal in a gaseous form through a first convergent-divergent nozzle and thereby rapidly cooling said metal in gaseous form by adiabatic expansion;

mixing said metal in gaseous form with said second element in a gaseous state; and passing a resultant mixture of said metal and second element in gaseous form through a second convergent-divergent nozzle and rapidly cooling said mixture by adiabatic expansion.

6. A method according to claim 5, wherein said metal and said other element form a chemical compound.

7. A method according to claim 6, wherein said other element is non metallic.

8. A method according to claim 5, wherein said other element is also a metal, and wherein said metal and said other element form an alloy.

9. A method according to claim 3, wherein said metal is silicon, said other element is nitrogen, and which further comprises producing silicon nitride.

10. A method according to claim 9, which further comprises maintaining the temperature of the gaseous mixture before it is expanded through said convergent-divergent nozzle at a temperature substantially higher than 2000° C. and a pressure substantially lower than $10^{-1}$ atmospheres.

11. A method according to claim 10, wherein the temperature of the reacting material after it is expanded through said convergent-divergent nozzle is substantially equal to about 1000° C. to 1500° C.

12. A method according to claim 10, wherein the temperature of the reacting material after it is expanded through said convergent-divergent nozzle is substantially equal to or lower than about 800° C.

13. A method according to claim 5, wherein said metal is aluminum, said other element is nitrogen, and which aluminum nitride is produced.

14. An apparatus for making a fine powder of a metal and a second element in an intimate mutual relation, comprising:

a reaction chamber for containing a source of metal vapor;

means for heating said reaction chamber;

means for introducing gas into said reaction chamber;

a condensation chamber; and a convergent-divergent nozzle leading from said reaction chamber to said condensation chamber.

15. A method for making a fine powder of a metal and a second element in an intimate mutual relation which utilizes a reaction chamber for containing a source of metal vapor, means for heating said reaction chamber, means for introducing gas into said reaction chamber, a condensation chamber, and a convergent-divergent nozzle leading from said reaction chamber to said condensation chamber, which further comprises:

introducing said metal into said reaction chamber;

heating said metal by the operation of said heating means so as to be boiled into a vapor;

introducing said second element in a gaseous state into said reaction chamber via said means for introducing gas, and mixing said second element with said metal vapor; and passing the mixture of said metallic vapor and said second element through said convergent-divergent nozzle into said condensation chamber and thereby rapidly cooling said mixture by adiabatic expansion.

16. A method according to claim 14, which further comprises forming a chemical compound from said metal and said other element form.

17. A method according to claim 15, wherein said second element is non metallic.

18. A method according to claim 16, wherein said metal is silicon, and said second element is nitrogen, and wherein silicon nitride is produced.

19. An apparatus according to claim 14, further comprising a gas preheating chamber through which said gas passes before being supplied into said reaction chamber, said gas preheating chamber also being heated by said heating means .

20. An apparatus for making a fine powder of a metal and another element in an intimate mutual relation, comprising:

a first reaction chamber for containing a source of metal vapor;

first means for heating said first reaction chamber;

a second reaction chamber for containing a source of metal vapor;

first means for introducing gas into said second reaction chamber;

a condensation chamber;

a first convergent-divergent nozzle leading from said first reaction chamber to said second reaction chamber; and a second convergent-divergent nozzle leading from said second reaction chamber to said condensation chamber.

21. An apparatus according to claim 20, further comprising a second means for introducing gas into said first reaction chamber.

22. An apparatus according to claim 20, further comprising a second means for heating said second reaction chamber.

23. An method for making a fine powder of a metal and a second element in an intimate mutual relation, utilizing an apparatus which includes a first reaction chamber for containing a source of metal vapor, first means for heating the reaction chamber, a second reaction chamber for containing the source of metal vapor, first means for introducing gas into the second reaction chamber, a condensation chamber, a first convergent-divergent nozzle leading from said first reaction chamber to said second reaction chamber, and a second convergent-divergent nozzle leading from said second reaction chamber to said condensation chamber, which comprises:

introducing said metal into said first reaction chamber;

heating said metal by operation of said first heating means so as to be boiled into a vapor;

passing said vapor through said first convergent-divergent nozzle into said second reaction chamber and thereby rapidly cooling said vapor by adiabatic expansion;

introducing said second element in a gaseous phase into said second reaction chamber via said first gas introduction means;

mixing said second element with said metal vapor in an at least partially condensed state in said second reaction chamber; and passing a mixture of said second element and said metal vapor through said second convergent-divergent nozzle and into said condensation chamber and thereby rapidly cooling said mixture by adiabatic expansion.

24. A method for making a fine powder of a metal and a second element in an intimate mutual relation, utilizing an apparatus which includes a first reaction chamber for containing a source of metal vapor, first means for heating said first reaction chamber, a second reaction chamber for containing the source of metal vapor, first means for introducing gas into said second reaction chamber, a condensation chamber, a first convergent-divergent nozzle leading from said first reaction chamber to said second reaction chamber, and a second convergent-divergent nozzle leading from said second reaction chamber to said condensation chamber, which comprises:

introducing said metal into said first reaction chamber;

heating said metal by operation of said first heating means so as to be boiled into a vapor;

introducing said second element in a gaseous state into said first reaction chamber via said second gas introduction means mixing said second element with said metal vapor to form a mixture;

passing said mixture of said metal vapor and said second elememt through said first convergent-divergent nozzle and into said second reaction chamber and thereby rapidly cooling said mixture by adiabatic expansion; and passing said mixture through said second convergent-divergent nozzle into said condensation chamber and thereby again being rapidly cooling said mixture by adiabatic expansion.

25. A method for making a fine powder of a metal and a second element in an intimate mutual relation, utilizing an apparatus which includes a first reaction chamber for containing a source of metal vapor, first means for heating said first reaction chamber, a second reaction chamber for containing the source of metal vapor, first means for introducing gas into the second reaction chamber, a condensation chamber, a first convergent-divergent nozzle leading from said first reaction chamber to said second reaction chamber, and a second convergent-divergent nozzle leading from said second reaction chamber to said condensation chamber, which comprises:

introducing said metal into said first reaction chamber;

heating said metal by operation of said first heating means so as to be boiled into a vapor;

introducing said second element in a gaseous state into said first reaction chamber via said second gas introduction means;

mixing said second element with said metal vapor passing said mixture of said metal vapor and said second element through said first convergent-divergent nozzle into said second reaction chamber and thereby rapidly cooling said mixture by adiabatic expansion;

introducing a gas supply into said second reaction chamber via said first gas introduction means;

mixing said metal vapor and said second element in an at least partially condensed state therein; and passing said mixture through said second convergent-divergent nozzle into said condensation chamber and thereby again rapidly cooling said mixture by adiabatic expansion.

26. An apparatus according to claim 20, said apparatus further comprising second means for heating said second reaction chamber, and wherein an additional metal is introduced into said second reaction chamber and is heated by operation of said second heating means so as to be boiled into a vapor, which mixes with said mixture of said metallic vapor and said other element in said second reaction chamber before said mixture is vented into said condensation chamber via said second conergent-divergent nozzle.

27. An apparatus according to claim 20, said apparatus further comprising a second means for heating said second reaction chamber, and wherein an additional supply of metal is introduced into said second reaction chamber and is heated by the operation of said second heating means so as to be boiled into a vapor, which mixes with said mixture of said metallic vapor and said other element in said second reaction chamber before said mixture is vented into said condensation chamber via said second convergent-divergent nozzle.

28. An apparatus according to claim 20, said apparatus further comprising second means for heating said second reaction chamber, and wherein an additional supply of metal is introduced into said second reaction chamber and is heated by the operation of said second heating means so as to be boiled into a vapor, which mixes with said mixture of said metallic vapor and said second element and said other gas supply in said second reaction chamber before said mixture is vented into said condensation chamber via said second convergent-divergent nozzle.

29. A method according to claim 23, which further comprises forming an element compound of said metal and said other element.

30. A method according to claim 29, wherein said other element is non metallic.

31. A method according to claim 29, wherein said metal is aluminum, said other element is nitrogen, and which aluminum nitride is produced.

32. An apparatus according to claim 20, wherein an outlet side of said first convergent-divergent nozzle is opposed to an inlet side of said second convergent-divergent nozzle, in said second reaction chamber, with a certain axial interval separating said outlet and inlet side.

33. An apparatus according to claim 20, wherein an outlet side of said first convergent-divergent nozzle is at least partially inserted into an inlet side of said second convergent-divergent nozzle, in said second reaction chamber.

34. An apparatus according to claim 20, wherein an outlet side of said first convergent-divergent nozzle is at least partially inserted into an inlet side of said second convergent-divergent nozzle, in said second reaction chamber.

* * * * *